(12) United States Patent
Mito et al.

(10) Patent No.: US 8,756,629 B2
(45) Date of Patent: Jun. 17, 2014

(54) WEB INFORMATION PROCESSING APPARATUS AND WEB INFORMATION PROCESSING METHOD, AND INFORMATION PROCESSING APPARATUS AND INFORMATION PROCESSING APPARATUS CONTROL METHOD

(75) Inventors: Koji Mito, Kawasaki (JP); Kazuhiro Matsubayashi, Yokohama (JP); Kazuna Maruyama, Tokyo (JP); Hirofumi Urabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 987 days.

(21) Appl. No.: 11/739,049

(22) Filed: Apr. 23, 2007

(65) Prior Publication Data

US 2007/0288955 A1    Dec. 13, 2007

(30) Foreign Application Priority Data

May 19, 2006    (JP) .................................. 2006-140904

(51) Int. Cl.
*G06F 3/00*    (2006.01)
*G06F 13/00*    (2006.01)
*H04N 5/445*    (2011.01)

(52) U.S. Cl.
USPC ........................................................ 725/37

(58) Field of Classification Search
CPC ............ H04N 21/2347; H04N 21/235; H04N 21/23614; H04N 21/4782; H04N 21/4622; H04N 21/47217; H04N 21/4725; H04N 21/858; H04N 21/8586; H04N 21/2183; H04N 21/8173

USPC .................. 715/511; 709/203, 231; 707/204; 705/14; 725/118, 37, 100, 88, 134, 725/139, 36, 120, 131; 700/83
See application file for complete search history.

(56) References Cited

U.S. PATENT DOCUMENTS

| 5,416,904 A | 5/1995 | Arai et al. |
| 5,533,147 A | 7/1996 | Arai et al. |
| 5,828,568 A | 10/1998 | Sunakawa et al. |
| 5,909,216 A | 6/1999 | Matsubayashi et al. |
| 6,266,611 B1 | 7/2001 | Matsubayashi |

(Continued)

FOREIGN PATENT DOCUMENTS

| EP | 1492348 A2 | 12/2004 |
| JP | 10-177532 | 6/1998 |

(Continued)

OTHER PUBLICATIONS

Korean Office Action, dated Nov. 14, 2008, in Korea 10-2007-0046410.

(Continued)

*Primary Examiner* — Nasser Goodarzi
*Assistant Examiner* — An Nguyen
(74) *Attorney, Agent, or Firm* — Fitzpatrick, Cella, Harper & Scinto

(57) ABSTRACT

A web information processing apparatus (100) displays a screen for designating a program to be associated with a web page and registered if, for example, a registration request is input from a user when the web page is being displayed. Then, information specifying the designated program and information specifying the web page being displayed are linked and registered (105). The registered information is used to detect a web page linked to the program being viewed and (if necessary) to display the web page.

13 Claims, 53 Drawing Sheets

(56) References Cited

U.S. PATENT DOCUMENTS

| | | |
|---|---|---|
| 6,460,038 B1 * | 10/2002 | Khan et al. .......................... 1/1 |
| 6,675,385 B1 | 1/2004 | Wang |
| 6,715,071 B2 | 3/2004 | Ono et al. |
| 6,738,982 B1 | 5/2004 | Jerding |
| 6,747,591 B1 | 6/2004 | Lilleness et al. |
| 6,993,721 B2 | 1/2006 | Rosin et al. |
| 7,071,865 B2 | 7/2006 | Shibamiya et al. |
| 7,155,729 B1 | 12/2006 | Andrew et al. |
| 2001/0044808 A1 * | 11/2001 | Milewski et al. ............. 707/204 |
| 2002/0010932 A1 * | 1/2002 | Nguyen et al. ................... 725/51 |
| 2002/0054154 A1 | 5/2002 | Fukuda et al. |
| 2002/0073149 A1 | 6/2002 | Young |
| 2002/0104088 A1 | 8/2002 | McGee, III et al. |
| 2002/0156832 A1 * | 10/2002 | Duri et al. ..................... 709/203 |
| 2002/0174187 A1 | 11/2002 | Kollar et al. |
| 2002/0188948 A1 * | 12/2002 | Florence ........................ 725/46 |
| 2003/0100965 A1 * | 5/2003 | Sitrick et al. .................... 700/83 |
| 2003/0220922 A1 * | 11/2003 | Yamamoto et al. ............... 707/7 |
| 2003/0237092 A1 * | 12/2003 | Suzuki ............................ 725/40 |
| 2004/0073944 A1 | 4/2004 | Booth |
| 2004/0203338 A1 | 10/2004 | Zilliacus |
| 2004/0268403 A1 * | 12/2004 | Krieger et al. ................. 725/112 |
| 2005/0003840 A1 | 1/2005 | Nakano ......................... 455/466 |
| 2005/0114885 A1 | 5/2005 | Shikata et al. |
| 2005/0198287 A1 | 9/2005 | Sauve et al. |
| 2005/0210145 A1 * | 9/2005 | Kim et al. ..................... 709/231 |
| 2006/0143036 A1 * | 6/2006 | Kato ................................ 705/1 |
| 2006/0227033 A1 | 10/2006 | Shibamiya et al. |
| 2006/0259938 A1 * | 11/2006 | Kinoshita et al. .............. 725/118 |
| 2007/0067217 A1 * | 3/2007 | Schachter et al. ................ 705/14 |
| 2007/0220418 A1 * | 9/2007 | Matsui et al. .................. 715/511 |

FOREIGN PATENT DOCUMENTS

| | | |
|---|---|---|
| JP | 2000-307993 | 11/2000 |
| JP | 2002-238043 A | 8/2002 |
| JP | 2003-296365 A | 10/2003 |
| JP | 2003-319279 | 11/2003 |
| JP | 2004-23641 | 1/2004 |
| JP | 2004-104640 | 4/2004 |
| JP | 2004-289776 A | 10/2004 |
| JP | 2005-20757 A | 1/2005 |
| JP | 2005-25661 | 1/2005 |
| JP | 2005-115790 A | 4/2005 |
| JP | 2005-192006 | 7/2005 |
| JP | 2005-295257 A | 10/2005 |
| JP | 2005-347893 A | 12/2005 |
| JP | 2006-41856 | 2/2006 |

OTHER PUBLICATIONS

Japanese Office Action, dated May 30, 2008, in JP 2006-140905.
Japanese Office Action dated May 30, 2008 issued during prosecution of related Japanese Patent Application No. 2006-140904.
U.S. Appl. No. 11/739,046, filed Apr. 23, 2007 Inventor(s): Maruyama, et al.

* cited by examiner

F I G. 10

|  | MUSIC CHANNEL | SPORTS CHANNEL | SHOPPING CHANNEL |
|---|---|---|---|
| 7 | HOGAKU RANKING ............ ............ ............ ............ | PRO BASEBALL BROADCAST ............ ............ ............ | USA SHOPPING ............ ............ ............ ............ |
| 8 | ............ SNAP SPECIAL ............ | SPORTS NEWS ............ SPORTS NEWS ............ | SALE SHOPPING ............ ............ ............ |
| 9 | MUSIC STAGE | SUMO MARUKO TOURNAMENT ............ ............ | ............ ............ ............ ............ |
| 10 | SHONAN ROCK FESTIVAL ............ ............ ............ | ............ SOCCER WORLD CHAMPIONSHIP MATCH ............ | DINING SHOPPING ............ ............ ............ |

1010

F I G. 12
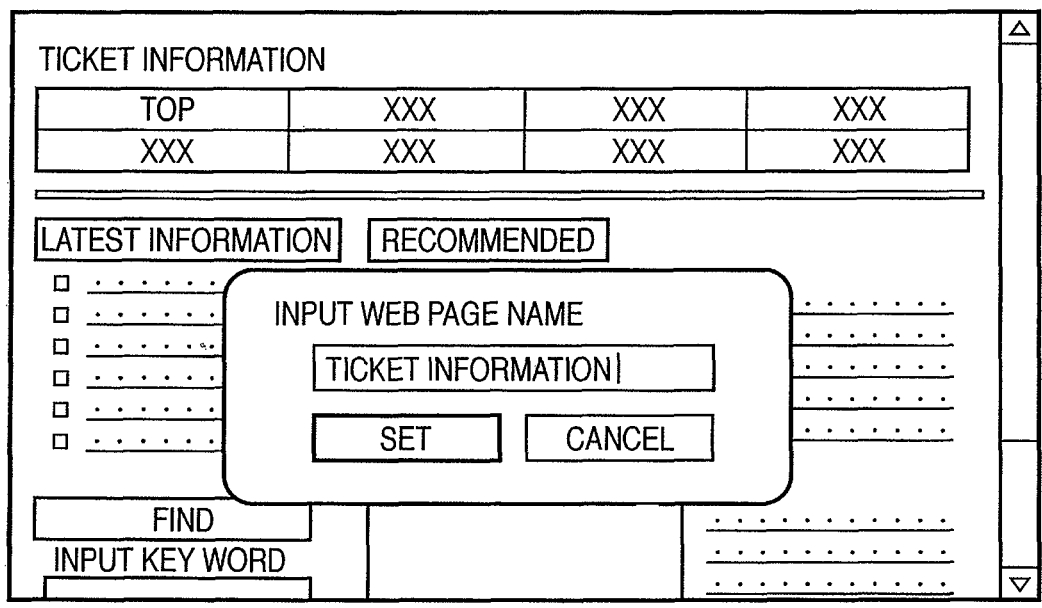

FIG. 13

| WEB PAGE INFORMATION | | | LINKED INFORMATION | | |
|---|---|---|---|---|---|
| WEB PAGE ADDRESS INFORMATION | WEB PAGE TITLE | | TYPE OF LINK | FORMAT | CONTENT OF LINK |
| http://www.ticket-info.co.jp/ | TICKET INFORMATION | | PROGRAM | ID | 0xDE |
| http://www.kimutaku-blog.jp/ | KIMURA TAKURO BLOG | | PROGRAM | TEXT | SNAP×SNAP |
| | | ... | | | |

Bookmark 1
Bookmark 2

DISPLAY ICON

DISPLAY WEB PAGE NAME

DISPLAY WEB PAGE ADDRESS

DISPLAY LINK REASON

F I G. 16
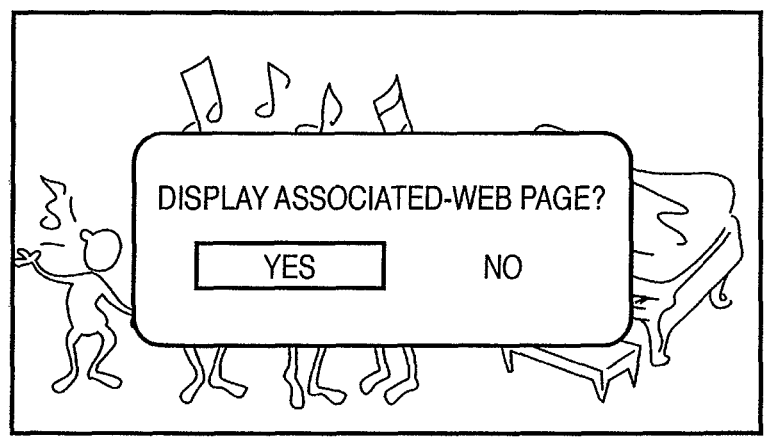

FIG. 19A

KEY WORD

TICKET INFORMATION

| TOP | XXX | XXX | XXX |
|-----|-----|-----|-----|
| XXX | XXX | XXX | XXX |

LATEST INFORMATION   RECOMMENDED

SELECT LINK METHOD
- SELECT LINKED KEY WORD
- INPUT LINKED KEY WORD

FIND
INPUT KEY WORD

FIG. 19B

CAST MEMBER NAME

TICKET INFORMATION

| TOP | XXX | XXX | XXX |
|-----|-----|-----|-----|
| XXX | XXX | XXX | XXX |

LATEST INFORMATION   RECOMMENDED

SELECT LINK METHOD
- SELECT LINKED CAST MEMBER NAME
- INPUT LINKED CAST MEMBER NAME

FIND
INPUT KEY WORD

FIG. 20A

KEY WORD

| SELECT KEY WORD | |
|---|---|
| SHONAN | CHRISTMAS |
| HOT SPRINGS | TRAVEL |
| CONCERT | GERMANY |
| SPACE | JOKES |
| LATEST | VOLLEYBALL |
| LIVE | SUMO |

FIG. 20B

CAST MEMBER NAMES

| SELECT CAST MEMBER | |
|---|---|
| AIKAWA SHOKO | NAKATA HIDEO |
| MORITA | HASEGAWA SEIKO |
| KIMURA TAKURO | YATA MAKIKO |
| FUTOKI KAZUKO | MATSUI HIDEO |
| YAMADA JIRO | SNAP |
| NAKAI MASAO | KATORI SHINJI |

F I G. 22

| WEB PAGE INFORMATION | | LINKED INFORMATION | | |
|---|---|---|---|---|
| WEB PAGE ADDRESS INFORMATION | WEB PAGE TITLE | TYPE OF LINK | FORMAT | CONTENT OF LINK |
| http://www.ticket-info.co.jp/ | TICKET INFORMATION | KEY WORD | TEXT | CONCERT |
| http://www.kimutaku-blog.jp/ | KIMURA TAKURO BLOG | CAST MEMBER NAME | TEXT | KIMURA TAKURO |
| ... | | | | |

Bookmark 1
Bookmark 2

FIG. 24A

GENRE

SELECT GENRE

| NEWS | SPORTS |
| FILM | INFORMATION |
| MUSIC | CULTURE |
| ANIME | HOBBIES |
| VARIETY | THEATER |
| DRAMA | WELFARE |

FIG. 24B

CHANNEL

SELECT CHANNEL

| SPACE CHANNEL | SHONAN TV |
| ANIME CHANNEL | MOVIE CHANNEL |
| MUSIC TV | CARTOON TV |
| TRAVEL CHANNEL | SPORTS CHANNEL |
| SHOPPING CHANNEL | HORSERACING CHANNEL |
| BS SHONAN | HISTORY CHANNEL |

F I G. 25

| WEB PAGE INFORMATION | | LINKED INFORMATION | | |
|---|---|---|---|---|
| WEB PAGE ADDRESS INFORMATION | WEB PAGE TITLE | TYPE OF LINK | FORMAT | CONTENT OF LINK |
| Bookmark 1 — http://www.ticket-info.co.jp/ | TICKET INFORMATION | GENRE | ID | 0x45 |
| Bookmark 2 — http://www.kimutaku-blog.jp/ | KIMURA TAKURO BLOG | CHANNEL | ID | 0x022B |
| ... | | | | |

F I G. 27
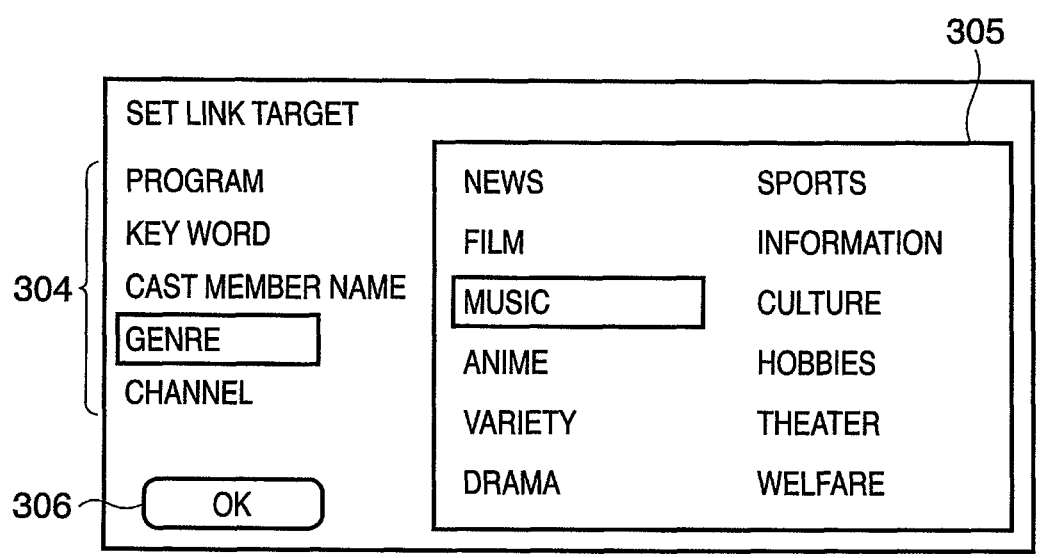

FIG. 28

| WEB PAGE INFORMATION | | LINKED INFORMATION | | |
|---|---|---|---|---|
| WEB PAGE ADDRESS INFORMATION | WEB PAGE TITLE | TYPE OF LINK | FORMAT | CONTENT OF LINK |
| http://www.ticket-info.co.jp/ | TICKET INFORMATION | PROGRAM | ID | 0xDE |
| | | KEY WORD | TEXT | CONCERT |
| | | CAST MEMBER | TEXT | SNAP |
| http://www.kimutaku-blog.jp/ | KIMURA TAKURO BLOG | CAST MEMBER | TEXT | KIMURA TAKURO |
| | | GENRE | ID | 0x54 |
| ... | | | | |

Bookmark 1: rows 1–3
Bookmark 2: rows 4–5

FIG. 31

| REGISTERED WEB PAGE LIST | |
|---|---|
| ROAD TRAFFIC INFORMATION | WEATHER INFORMATION |
| MOVIE INFORMATION | MUSIC STAGE |
| KIMURA TAKURO BLOG | MUSIC INFORMATION |
| SNAP×SNAP | SNAP BULLETIN BOARD |
| TICKET INFORMATION | MUSIC TV |
| DINING INFORMATION | SNAP HOME PAGE |

F I G. 32
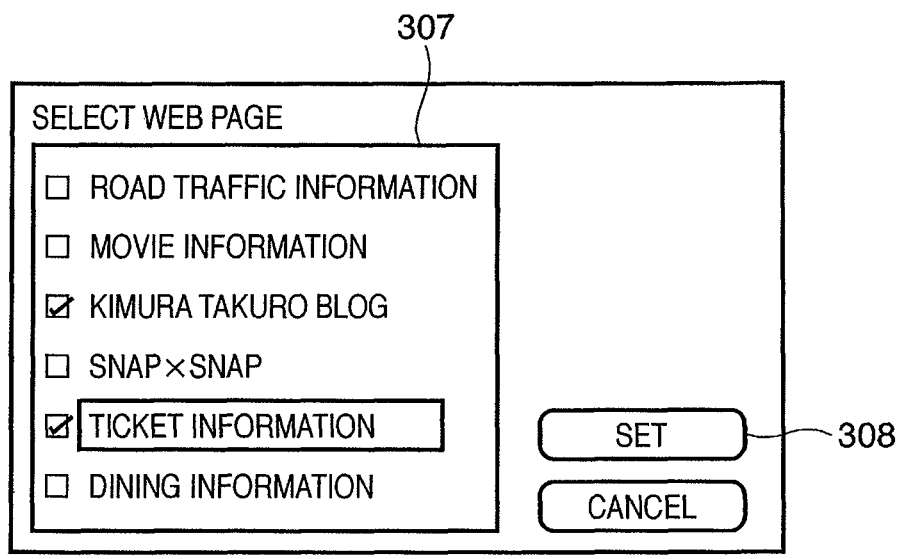

FIG. 33

| WEB PAGE INFORMATION | | LINKED INFORMATION | | |
|---|---|---|---|---|
| WEB PAGE ADDRESS INFORMATION | WEB PAGE TITLE | TYPE OF LINK | FORMAT | CONTENT OF LINK |
| http://www.ticket-info.co.jp/ | TICKET INFORMATION | GENRE | ID | 0x40 |
| http://mmtv.co.jp/bbs/snap/ | SNAP BULLETIN BOARD | CAST MEMBER | TEXT | SNAP |
| | | CHANNEL | ID | 0x022B |
| http://www.kimutaku-blog.jp/ | KIMURA TAKURO BLOG | CAST MEMBER | TEXT | KIMURA TAKURO |
| http://www.ticket-info.co.jp/ | TICKET INFORMATION | | | |
| http://www.xxtv.co.jp/snasna/ | SNAP×SNAP | | | |
| ... | | | | |

Bookmark 1: rows 1–3
Bookmark 2: rows 4–5

F I G. 40

|   | MUSIC CHANNEL | SPORTS CHANNEL | SHOPPING CHANNEL |
|---|---|---|---|
| 7 | HOGAKU RANKING | PRO BASEBALL BROADCAST | USA SHOPPING |
| 8 | ⋮ SNAP SPECIAL | SPORTS NEWS SPORTS NEWS | SALE SHOPPING |
| 9 | 🪐 MUSIC STAGE | 🪐 SUMO MARUKO TOURNAMENT | |
| 10 | SHONAN ROCK FESTIVAL | SOCCER WORLD CHAMPIONSHIP MATCH | DINING SHOPPING |

309 points to MUSIC STAGE cell

FIG. 46

| | PROGRAM NAME | PROGRAM-SPECIFIC ID | WEB PAGE INFORMATION ||
| --- | --- | --- | --- | --- |
| | | | WEB PAGE ADDRESS INFORMATION | WEB PAGE TITLE |
| SEARCH RESULTS 1 | MUSIC STAGE | 0x12 | http://www.ticket-info.co.jp/ | TICKET INFORMATION |
| SEARCH RESULTS 2 | SNAP SPECIAL | 0x34 | http://mmtv.co.jp/bbs/snap/ | SNAP BULLETING BOARD |
| | | | http://www.kimutaku-blog.jp/ | KIMURA TAKURO BLOG |
| | | | http://www.ticket-info.co.jp/ | TICKET INFORMATION |
| SEARCH RESULTS 3 | SNAP×SNAP | 0x56 | http://www.xxtv.co.jp/snasna/ | SNAP×SNAP |
| | | | http://www.kimutaku-blog.jp/ | KIMURA TAKURO BLOG |
| | ... | | | |

F I G. 48
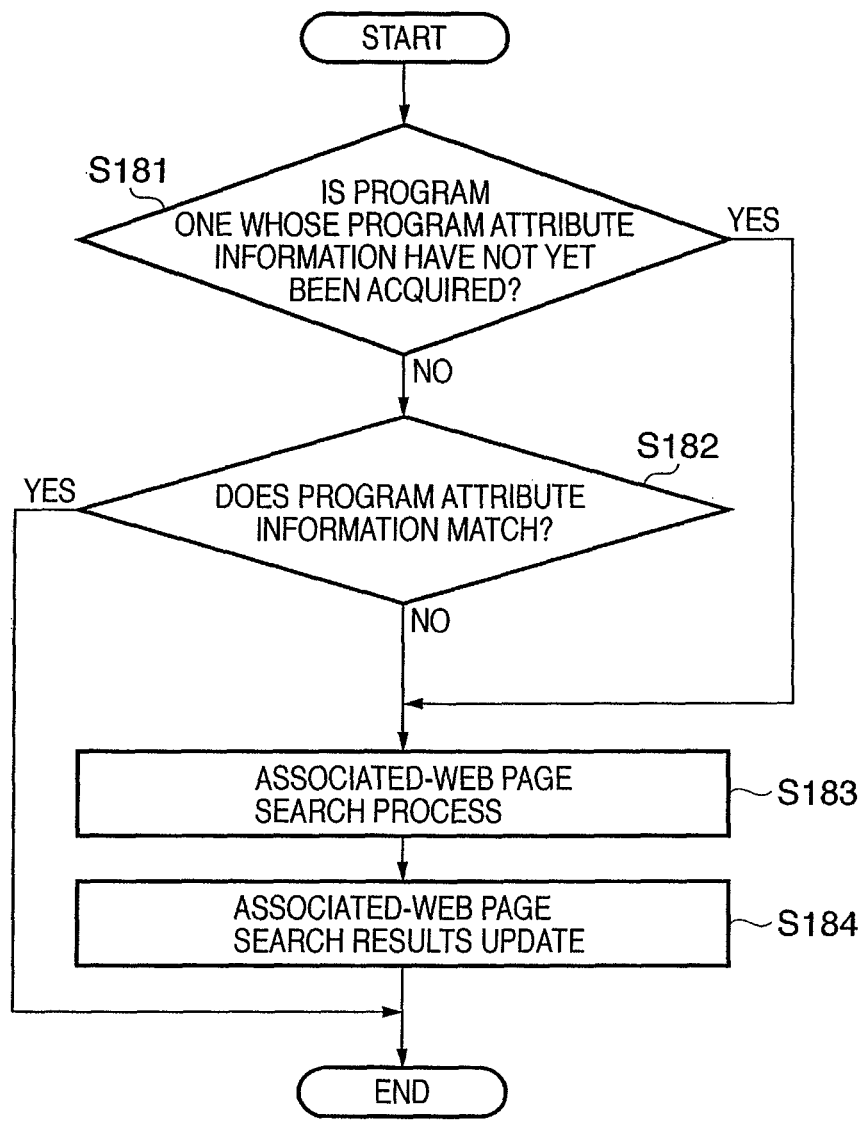

FIG. 50

| ACQUISITION ORDER | ACQUISITION RANGE | | |
|---|---|---|---|
| | CHANNEL NUMBER | DATE | TIME SLOT |
| 1 | 101 | TODAY | 00:00:00~02:59:59 |
| 2 | 101 | TODAY | 03:00:00~05:59:59 |
| 3 | 101 | TODAY | 06:00:00~08:59:59 |
| ⋮ | | | |
| 53 | 102 | 5 DAYS AHEAD | 12:00:00~14:59:59 |
| 54 | 102 | 5 DAYS AHEAD | 15:00:00~17:59:59 |
| 55 | 102 | 5 DAYS AHEAD | 18:00:00~20:59:59 |
| ⋮ | | | |

F I G. 52
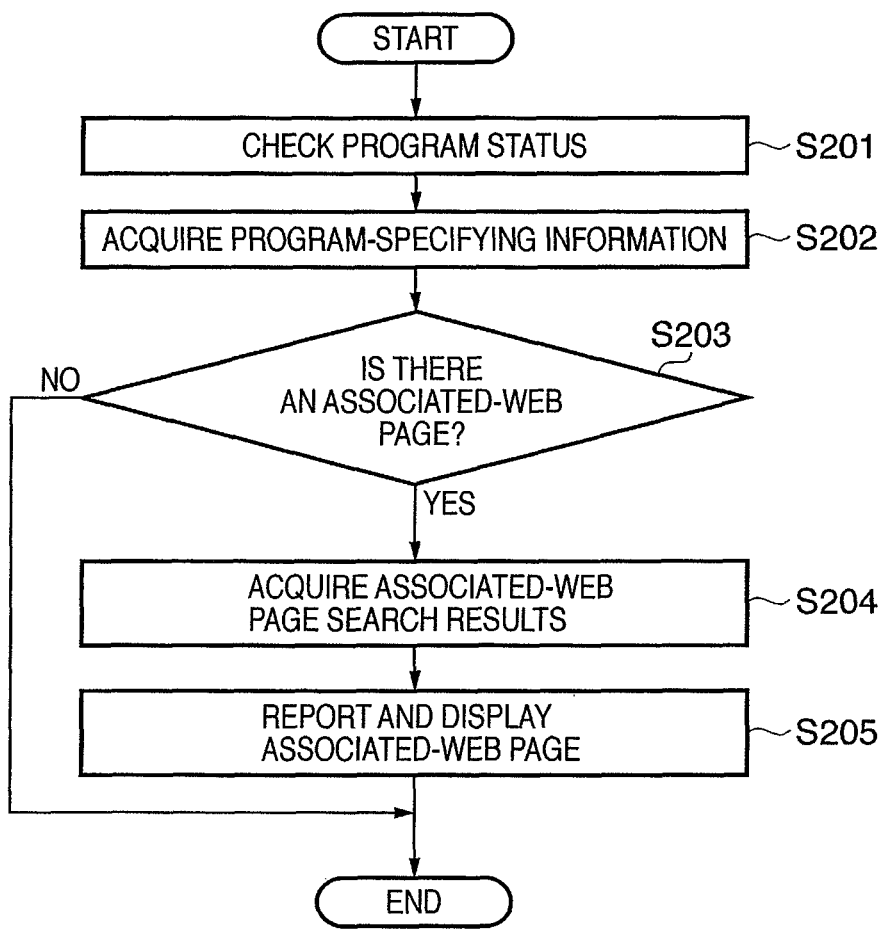

WEB INFORMATION PROCESSING APPARATUS AND WEB INFORMATION PROCESSING METHOD, AND INFORMATION PROCESSING APPARATUS AND INFORMATION PROCESSING APPARATUS CONTROL METHOD

BACKGROUND OF THE INVENTION

1. Field of the Invention

The present invention relates to a web information processing apparatus and a web information processing method, and an information processing apparatus and information processing apparatus control method, for associating and registering an arbitrary web page and a broadcast program (hereinafter "program").

2. Description of the Related Art

Receivers, PC and the like that, in addition to having the capability to receive broadcast transmissions and output video and audio, are also capable of accessing a server on a computer network and displaying a web page are now commercially available. Moreover, both broadcasting service providers and communication service providers have advanced a variety of arguments and proposals concerning a fusion of television broadcasting and data communications, and it is not hard to imagine that, in the near future, viewers will be able to get services that use both broadcasting and communications without making a conscious distinction between the two.

Given this situation, receivers having the capability to provide services that combine broadcast program viewing and, for example, connection to the internet, are being studied. For example, Japanese Laid-Open Patent Publication No. 2003-319279 (D1) describes a digital TV broadcast receiver that detects URL information transmitted as accompanying information for digital TV broadcast data and stores the detected URL information in a URL database. The digital TV broadcast receiver is equipped with an internet connection capability as well as the ability to display a list of the URLs stored in the URL database, connect to a URL designated by a user, and display a web page.

Japanese Laid-Open Patent Publication No. 2004-23641 (D2) discloses a receiver that, while receiving and displaying a broadcast program, connects to the internet based on URL information transmitted with the broadcast of that program and simultaneously displays a web page and the program.

Japanese Laid-Open Patent Publication No. H10-177532 (D3) describes a method and apparatus that uses internet URn information associated with a program that is contained in TV program schedule data to automatically display on the TV screen an internet home page linked to the TV program.

Japanese Laid-Open Patent Publication No. 2004-104640 (D4) describes a digital TV broadcasting receiver that associates and stores program name data included in the TV broadcast with a URL or an e-mail address, so that this information can be seen at any time when so notified during broadcast.

In addition, Japanese Laid-Open Patent Publication No. 2006-041856 (D5) discloses a technology that, when adding and storing a TV program name and other such EPG (Electronic Program Guide) information during bookmark registration and browsing a web page during TV program viewing, searches for a registered bookmark with the EPG information of the TV program being viewed. With the technology disclosed in D5, if the results of the search for a registered bookmark indicate that there is such a bookmark, that web page is automatically displayed.

However, with the digital TV receiver described in D1, only URL information is stored in the URL database, and therefore the URL information cannot be associated with a program. Moreover, the URL information cannot be set freely by a user who is viewing the program.

In addition, the receiver described in D2 handles only URL information transmitted with the TV broadcast transmission and URL information displayed or output as audio during the program, and consequently can only handle URL information that is already associated on the broadcasting station end to its own programs to be broadcast.

In addition, with the receiver described in D3, the URL information of the home page that is linked to the program and displayed is included in the program schedule data in advance by the program schedule data provider. As a result, the viewer cannot link to a program and display a home page having URL information that is not included in the TV program schedule data.

Further, the receiver described in D4 only registers a URL or e-mail address notified during the program and does not provide the ability to access a registered URL. Moreover, as with D2 and D3, the receiver described in D4 registers only information notified during the program, and therefore cannot register an arbitrary web page.

At present, viewers want to be able to associate programs they view and web pages they select themselves (hereinafter such web pages are called arbitrary web pages), and access those arbitrary web pages easily when viewing such programs.

For example, a viewer watching a music program wants to be able to access a web bulletin board where fans of the cast gather and to communicate with other fans on the web bulletin board while watching the concert.

However, in the current environment, either the broadcasters or the program schedule data providers do no more than provide viewers with the URLs of pre-selected and set, fixed web pages, such as the web sites of the cast or the web sites of the music program. In other words, the structure is the same as that of the technologies disclosed in the patent publications described above. As a result, it is difficult to argue that URL information suited to the numerous and diverse individual tastes of viewers is being provided.

It might be assumed that broadcasters and program schedule data providers could select web pages suited to the desires of all viewers prior to program transmission and provide those web pages together with the program as URL information. However, it is very difficult to identify in advance the desires of each one of so large a number of viewers. Further, although the broadcasters or program schedule data providers could set arbitrary web pages themselves without regard to the desires of viewers, for broadcasters to select the web pages to be linked from among so large a number of web pages is in reality impossible. Consequently, with the technology disclosed in the patent publications described above, it has not been possible to provide the capability to achieve the desires of viewers.

As a result, viewers have had to launch a web browser manually while viewing a program, and search for and display an arbitrary web page. Alternatively, it has been necessary for viewers simply to register a web page found in advance in their web browser using the web browser's bookmark function, and to select and display the desired web page from among the registered web pages while viewing the program. This is not only a burden on the viewer but a forced inconvenience as well, insofar as the viewer must always remember which web page is the web page that he or she wishes to display when viewing the program.

One method of solving the problems described above is described in D5. However, with the technology disclosed in D5, several problems such as those described below exist.

(1) The information that is to be associated when registering the web page in the bookmark is limited to the EPG information of the TV program currently being viewed. In other words, even when a web page that one would like to link to a program and retain is found, registration of the web page must be performed in conjunction with the broadcast time of that program. Moreover, an arbitrarily determined key word cannot be linked.

(2) When book-marking the web page, if a TV broadcast is being received and displayed, bookmark registration associated with program information is requested. In other words, in order to carry out ordinary book-marking that is not linked to program information, program viewing must be interrupted.

(3) There is no detailed disclosure of the process involved when associating multiple web pages with a single piece of program information, or of the method of display involved when multiple web pages are linked to a single piece of program information. Moreover, there is no description of the specific process involved when linking a single web page to a plurality of pieces of program information. When applying the technology described in D5, it appears that linking a given web page to three types of additional information creates three entries for the same web page as bookmark entries, which is very inconvenient for the viewer.

(4) There is no arrangement for notifying a web page associated with a program to the viewer outside of viewing the program. For example, there is no way of knowing whether a desired web page is associated with a program displayed in an EPG or other electronic program schedule.

SUMMARY OF THE INVENTION

The present invention is conceived in light of the problems of the conventional art as described above, and provides a web information processing apparatus and a web information processing method, and an information processing apparatus and information processing apparatus control method, that is capable of associating and registering arbitrary web page information and a program with a high degree of convenience compared to the conventional art.

According to an aspect of the present invention, there is provided a web information processing apparatus comprising: first display unit configured to display a web page on a connected display device; input unit configured to accept a user instruction; registration request detection unit configured to detect an input of a registration request from the user through the input unit; web page information acquisition unit configured to acquire web page information for specifying either a web page being displayed by the first display unit or a pre-registered web page; second display unit configured to display on the display device a designation screen that allows the user to specify program-associated information that to be associated with the web page; storage unit configured to associate and store in a storage unit the program-associated information specified through the designation screen and the web page information; and selection unit configured to display a selection screen that enables the user either to associate and store the web page information and the program-associated information or to store the web page information without associating it with the program-associated information if a registration request from the user is detected.

According to another aspect of the present invention, there is provided a web information processing method for associating and registering information relating to a broadcast program with an arbitrary web page, comprising: a registration request detection step of detecting input of a registration request from a user; a web page information acquisition step of acquiring web page information for specifying either a web page being displayed by a display device or a pre-registered web page in accordance with detection of the registration request; a linked information acquisition step of allowing the user to specify information relation to a program to be associated with the web page as program-associated information through a designation screen; a storage step of associating and storing in a storage unit program-associated information specified through the designation screen and the web page information; and a selection step of displaying a selection screen that enables the user either to associate and store the web page information and the program-associated information or to store the web page information without associating it with the program-associated information when a registration request from the user is detected.

According to further aspect of the present invention, there is provided an information processing apparatus capable of receiving broadcast transmissions and having web display unit configured to browse an arbitrary web page, the information processing apparatus comprising: first acquisition unit configured to acquire first attribute information relating to a web page; second acquisition unit configured to acquire second attribute information relating to a channel or a program received by a receiving unit for receiving a broadcast transmission; storage unit configured to associate and store in a storage unit first attribute information acquired by the first acquisition unit with at least one of attribute information acquired by the second acquisition unit; and selection unit configured to display a selection screen for allowing the user to select whether or not to associate first attribute information acquired by the first acquisition unit with second attribute information acquired by the second acquisition unit and to store in the storage unit.

According to yet further aspect of the present invention, there is provided an information processing apparatus control method for an information processing apparatus capable of receiving broadcast transmissions and having web display unit configured to browse an arbitrary web page, the control method comprising: a first acquisition step of acquiring first attribute information relating to a web page; a second acquisition step of acquiring second attribute information relating to a channel or a program received by a receiving unit for receiving a broadcast transmission; a storage step of associating and storing in a storage unit first attribute information acquired in the first acquisition step with at least one of attribute information acquired in the second acquisition step; and a selection step of displaying a selection screen for allowing the user to select whether or not to associate first attribute information acquired in the first acquisition step with second attribute information acquired in the second acquisition step and store in the storage unit.

Further features of the present invention will become apparent from the following description of exemplary embodiments with reference to the attached drawings.

BRIEF DESCRIPTION OF THE DRAWINGS

FIG. 10 is a diagram showing an example of a program list screen in the TV receiver of the first embodiment of the present invention;

FIG. 12 is a diagram showing an example of a program list screen in the TV receiver of the first embodiment of the present invention;

FIG. 13 is a diagram showing a specific example of associated-web page information retained by an associated-web page information holding unit in the TV receiver of the first embodiment of the present invention;

FIG. 16 is a diagram showing an example of a screen for confirming display of a web page associated with the program being received in the TV receiver of the first embodiment of the present invention;

FIGS. 19A and 19B are diagrams showing examples of selection screens for selecting methods of setting linked information in the TV receiver of the second embodiment of the present invention;

FIGS. 20A and 20B are diagrams showing examples of selection screens for selecting a key word or a cast member name in the TV receiver of the second embodiment of the present invention;

FIG. 22 is a diagram showing an example of associated-web page information retained by an associated-web page information holding unit 109 in the TV receiver of the second embodiment of the present invention;

FIGS. 24A and 24B are diagrams showing examples of screens showing genre and channel lists in the TV receiver of the third embodiment of the present invention;

FIG. 25 is a diagram showing an example of associated-web page information retained by the associated-web page information holding unit 109 in the TV receiver of the third embodiment of the present invention;

FIG. 27 is a diagram showing an example of a setting screen for setting linked information in the TV receiver of the fourth embodiment of the present invention;

FIG. 28 is a diagram showing an example of associated-web page information retained by the associated-web page information holding unit 109 in the TV receiver of the fourth embodiment of the present invention;

FIG. 31 is a diagram showing an example of a screen showing a list of registered web pages in the TV receiver of the fifth embodiment of the present invention;

FIG. 32 is a diagram showing an example of a web page selection screen in the TV receiver of the fifth embodiment of the present invention;

FIG. 33 is a diagram showing an example of associated-web page information retained by the associated-web page information holding unit 109 of the TV receiver of the fifth embodiment of the present invention;

FIG. 40 is a diagram showing an example of a state in which the existence of associated web pages is notified using an EPG, in the TV receiver of the ninth embodiment of the present invention;

FIG. 46 is a diagram showing a specific example of associated web page search results retained by a search results holding unit in the TV receiver of the eleventh embodiment of the present invention;

FIG. 48 is a flow chart illustrating steps in the process of updating associated web page search results in the TV receiver of the eleventh embodiment of the present invention;

FIG. 50 is a diagram showing a specific example of update management information retained by an update management information holding unit of the TV receiver of the eleventh embodiment of the present invention;

FIG. 52 is a flow chart illustrating steps in the process of notifying and displaying an associated web page in the TV receiver of the twelfth embodiment of the present invention.

DESCRIPTION OF THE EMBODIMENTS

Preferred embodiments of the present invention will now be described in detail in accordance with the accompanying drawings.

First Embodiment

Figure 1:
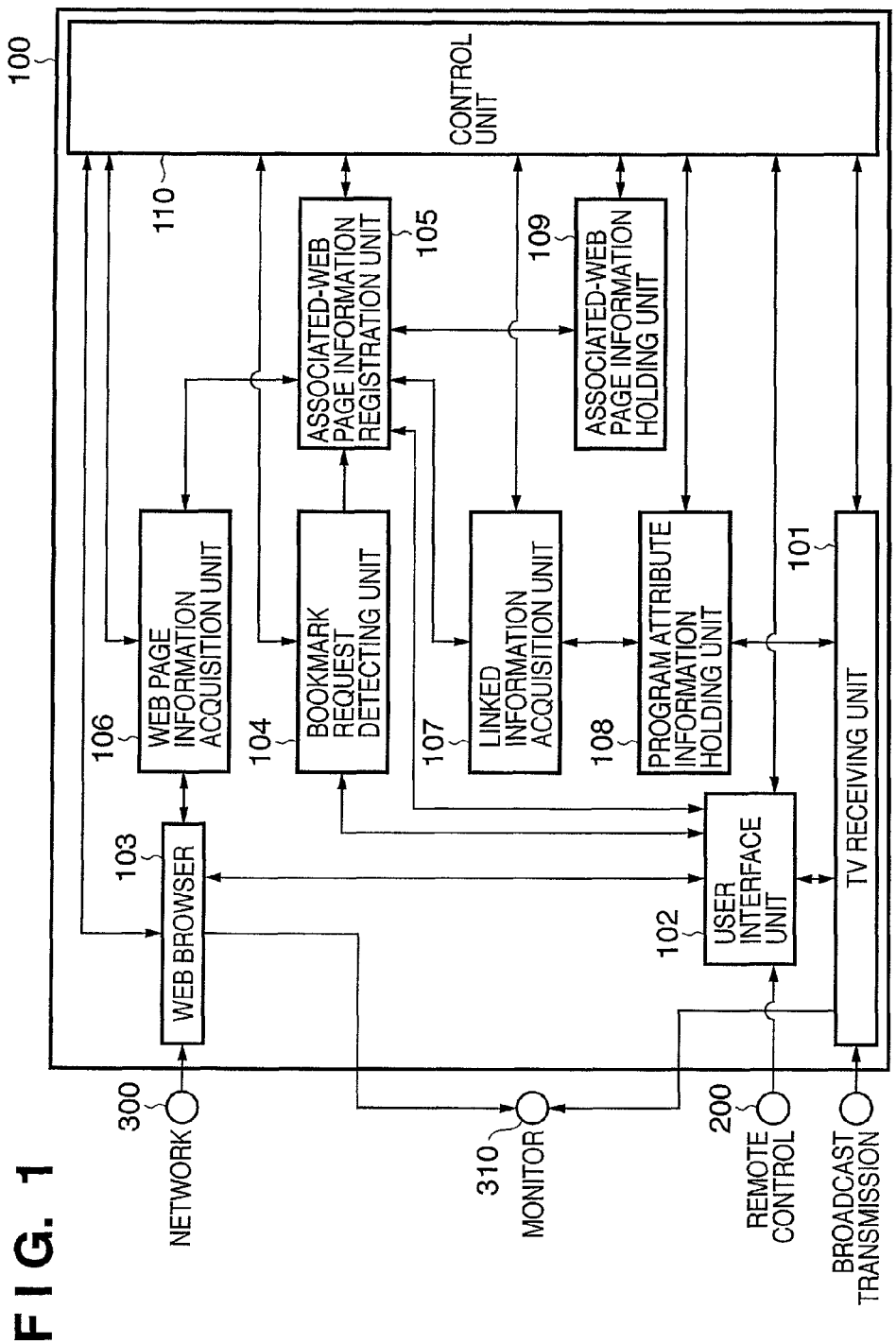
FIG. 1 is a block diagram showing a configuration of a web information registration apparatus as one example of a web information processing apparatus according to a first embodiment of the present invention.
Figure 2:
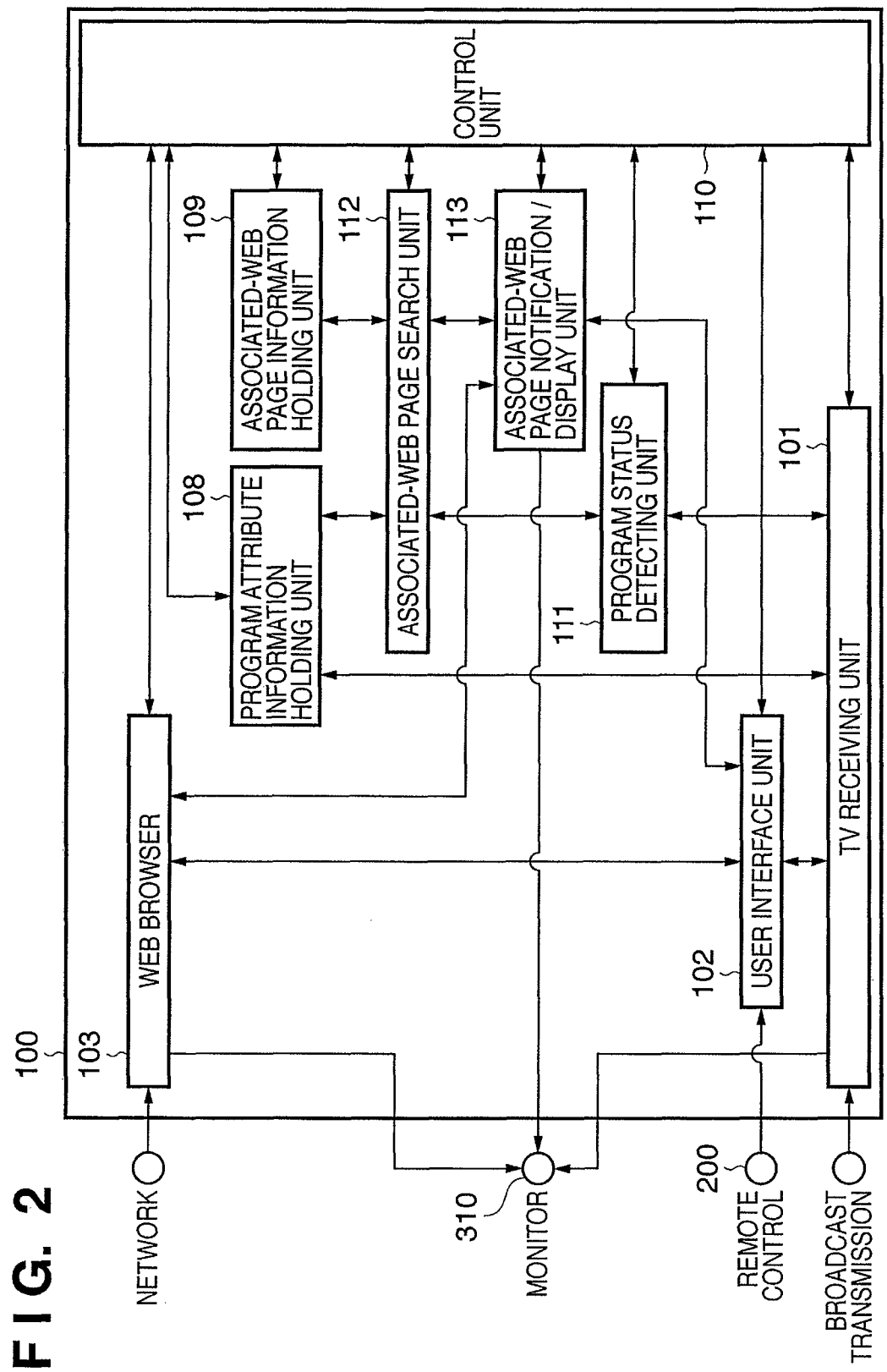
FIG. 2 is a block diagram showing a configuration of a web information display apparatus as another example of the web information processing apparatus according to the first embodiment of the present invention.

FIG. 1 shows a configuration of a web information registration apparatus as one example of a web information processing apparatus according to a first embodiment of the present invention. FIG. 2 shows a configuration of a web information displaying apparatus as another example of the web information processing apparatus according to the first embodiment of the present invention.

Figure 43:
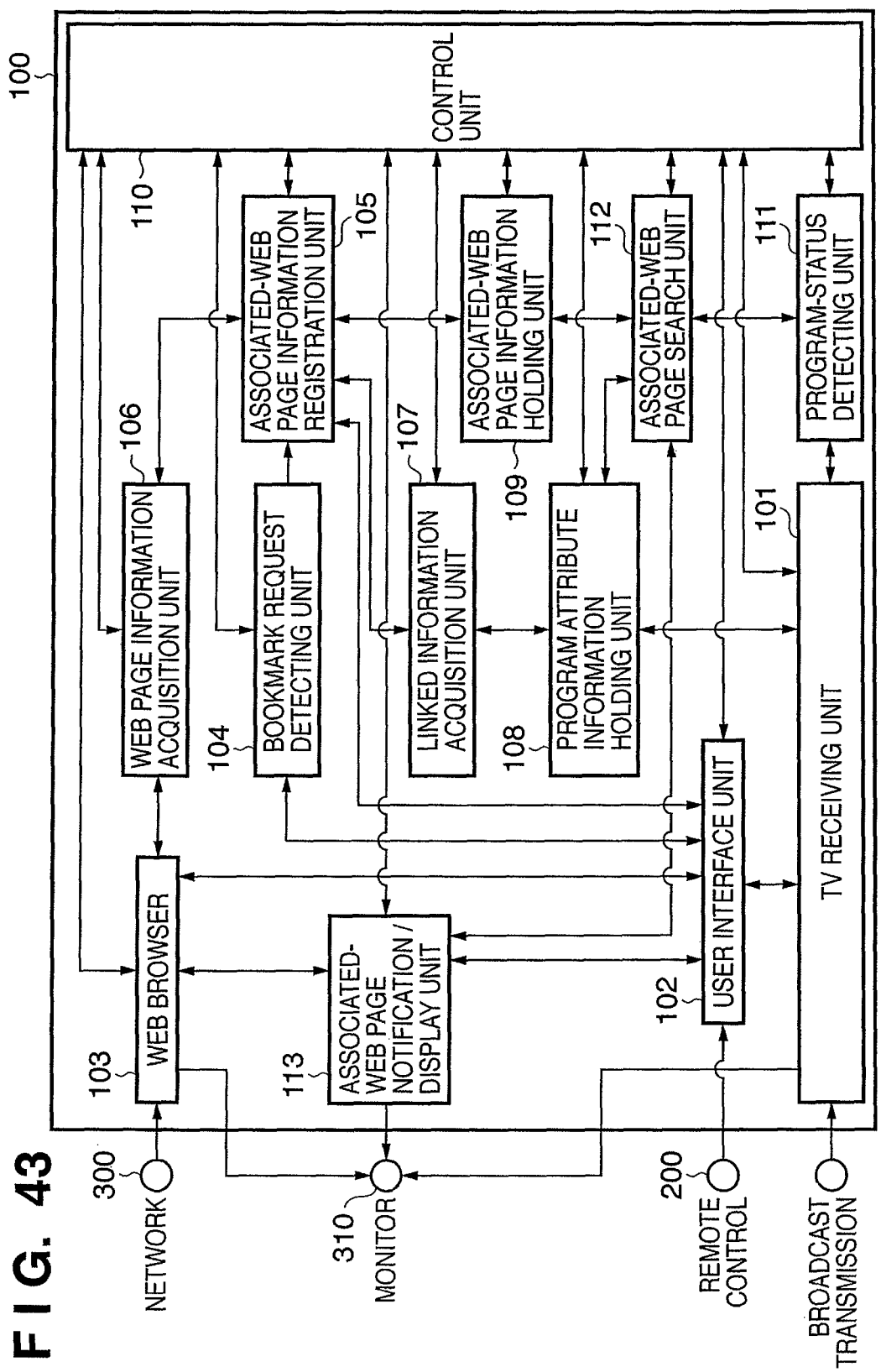
FIG. 43 is a block diagram showing a configuration of a web information registration and display apparatus as another and further example of the web information processing apparatus according to the first embodiment of the present invention.

In addition, FIG. 43 shows a configuration of a web information registration and display apparatus that combines the web information registration unit shown in FIG. 1 and the web information display unit shown in FIG. 2 in a single apparatus, as another and further example of the web information processing apparatus according to the first embodiment of the present invention. In FIG. 1, FIG. 2 and FIG. 43, identical structures are given the same reference numerals.

It should be noted that, hereinafter, for convenience, the description proceeds on the assumption that the present invention is adapted to a TV receiver as one example of a web information registration and display apparatus having the configuration shown in FIG. 43. However, even in a configuration in which the web information registration apparatus of FIG. 1 is, for example, a PC, and the web information display apparatus of FIG. 2 is, for example, a TV receiver, except for where the functional blocks that perform the actions in question are different, it is possible to implement the same processes.

In the following description, although the TV receiver of the present embodiment is operated using a remote control, the same operations are possible using a control panel, not shown, provided on the receiver itself.

Figure 3:
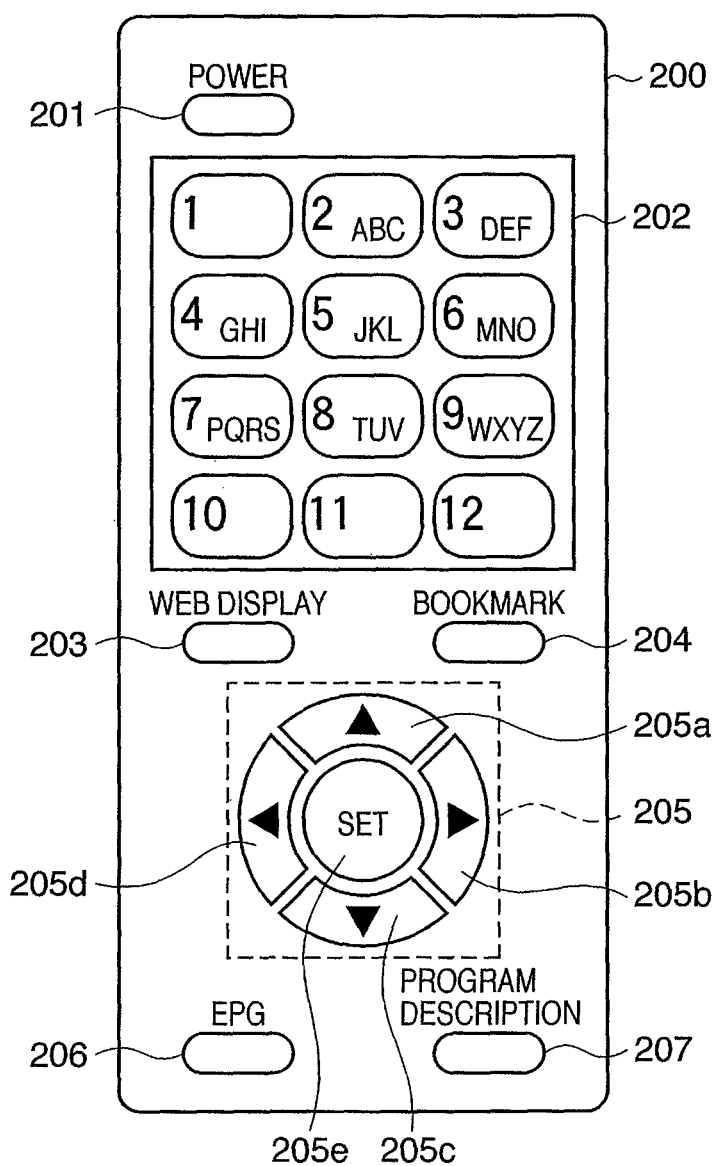
FIG. 3 shows the external appearance of a remote control 200 used for a TV receiver in the present embodiment.

FIG. 3 shows an external appearance of a remote control 200 used with the TV receiver of the present embodiment. It should be noted that FIG. 3 shows only the buttons necessary to the following description, and in reality other buttons may be included.

A power button 201 is a button for instructing that power to a TV receiver 100 be turned ON/OFF.

Numerical buttons 202 are buttons for carrying out channel selection and text input.

A browse button 203 is a button for carrying out a web page browse request.

A bookmark button 204 is a button for carrying out a web page registration request.

A select/set button 205 consists of cursor buttons 205a to 205d and a set button 205e. The cursor buttons 205a to 205d arranged around the set button 205e are buttons for carrying out selection screen focus shift and web page scroll. The single set button 205e located in the center is a button for setting a menu selection focused on in the selection screen.

An electronic program guide button 206 is a button for causing an electronic program guide (hereinafter "EPG") to be displayed.

A description button 207 is a button that causes a program description to be displayed.

First, with reference to FIG. 1, a description is given of the configuration relating to a web page registration process in the TV receiver 100 of the present embodiment.

The TV receiver 100 of the present embodiment is able to link an arbitrary web page and arbitrary program attribute information and register the associated web page and program attribute information. Program attribute information is various attribute information provided for each program by the broadcasting station or the like. For example, in addition to the broadcast channel and a program-specific ID, text information such as the name of the program and the program content, genre information that specifies the program genre, and cast information and the like are also attribute information. Of course, all information relating to the program, even if other than these types of information, becomes attribute information. Moreover, among the standard regulations issued by the Association of Radio Industries and Businesses (ARIB), the organization that sets broadcast regulations in Japan, ARIB STD-B10 version 4.0 describes standard requirements relating to service information used in digital broadcasting. The various types of information that are included in service information as defined by these regulations can be utilized as program attribute information in the present invention. It should be noted that in the present invention, the program attribute information should not be limited to the Service Information (SI) defined in the Japanese standard regulations. Rather, variety kinds of information relating to a program, which is similar to the Service Information in the Japanese standard regulations and is defined in other standard regulations in the world, can also be used as the program attribute information of the present invention.

It should be noted that, of the program attribute information, that program attribute information which is linked to a web page and registered is hereinafter referred to as "linked information" or "program-associated information". In the first embodiment, the linked information is any information that can designate a program. In addition, any web page that is associated with linked information and registered is referred to as an "associated web page" and information in which the linked information and the associated web page are associated is referred to as "associated-web page information".

In FIG. 1, a TV receiving unit 101 selects a carrier (carrier wave) that displays video and audio from a received broadcast transmission, demodulates it, and generates an MPEG-format transport stream (hereinafter "TS"). Next, the TS thus generated is separated into video, audio and data (additional information). Then, the video and audio are decoded, and output to a monitor and an audio output unit (not shown), the data is converted into program attribute information having a format that permits EPG display and program search, and the converted data is stored in a program attribute information holding unit 108. The TV receiving unit 101 displays an EPG and a program description based on the program attribute information that is acquired from the program attribute information holding unit 108, switches the reception channel based on a channel selection request, and so forth.

A user interface unit 102, which functions as input means, receives instruction data from the remote control 200 shown in FIG. 3 and carries out a process of notifying the instruction data thus received. For example, in a case in which the user interface unit 102 receives a channel selection request for a particular channel generated by the pressing of the numerical buttons 202 of the remote control 200, the user interface unit 102 notifies that channel selection request to the TV receiving unit 101. Or, if the user interface unit 102 receives a web page browse request generated by pressing the browse button 203 of the remote control 200, the user interface unit 102 notifies that web page browse request to a web browser 103. Likewise, if the user interface unit 102 receives an associated web page registration request generated by pressing the bookmark button 204 of the remote control 200, the user interface unit 102 notifies that associated web page registration request to a bookmark request detecting unit 104 that functions as registration request detection means.

The web browser 103, which functions as a first display means, carries out display of a web page on a monitor 310 based on web page data described in a mark-up language such as HTML (HyperText Markup Language) or the like that the web browser 103 receives from a web server through a network 300.

The bookmark request detecting unit 104 detects the notifying of an associated web page registration request from the user interface unit 102 and notifies that there has been an associated web page registration request to an associated-web page information registration unit 105.

The associated-web page information registration unit 105, which functions as a storage means, responds to the associated web page registration request from the bookmark request detecting unit 104 and registers associated-web page information linking linked information and associated-web page information in an associated-web page information holding unit 109, details of which are given later with reference to FIG. 4.

A web page information acquisition unit 106 acquires from the web browser 103 information that includes the address and title of a web page being displayed (hereinafter referred to as web page information) and sends this web page information to the associated-web page information registration unit 105. It should be noted that the web page information that the web page information acquisition unit 106 acquires is not limited only to the address (URL) and title.

A linked information acquisition unit 107 acquires from the program attribute information holding unit 108 the linked information for which there is an acquisition request from the associated-web page information registration unit 105 and sends that linked information to the associated-web page information registration unit 105.

The program attribute information holding unit 108 retains program attribute information acquired from the TV receiving unit 101. The associated-web page information holding unit 109 holds associated-web page information acquired from the associated-web page information registration unit 105.

It should be noted that the apparatuses shown in FIG. 1, FIG. 2 and FIG. 43 are comprehensively controlled by a CPU or the like. For example, a control unit 110 controls the process whereby the web page information acquisition unit 106 acquires the address (URL) and title information and the like of a web page and transmits that information to the associated-web page information registration unit 105. In addition, the functional units shown in these drawings can be implemented as hardware or configured so as to be executable by software.

Figure 4:
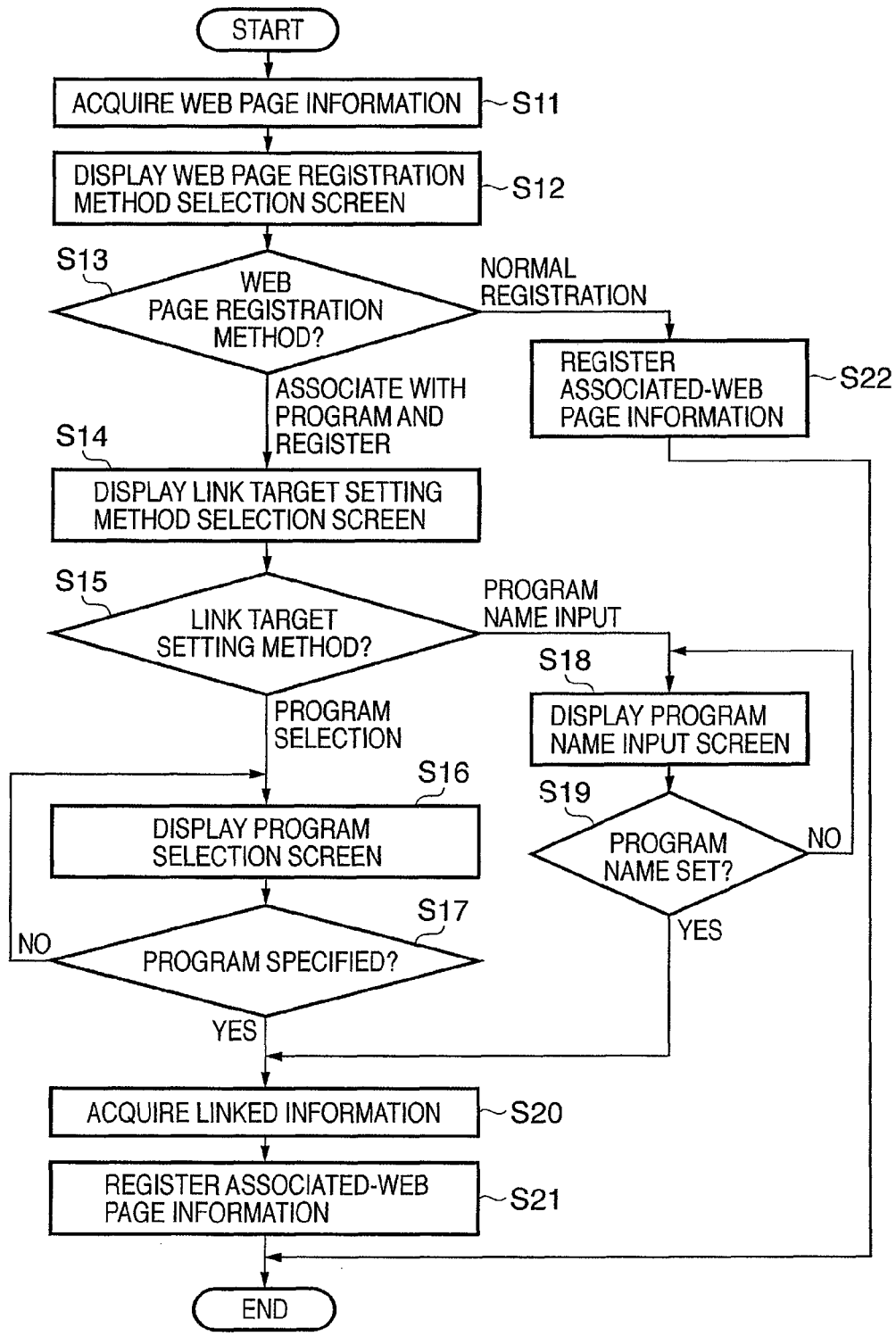
FIG. 4 is a flow chart illustrating steps in a process of registering associated-web page information in the TV receiver of the first embodiment of the present invention.

(Web page information registration process) A description is now given of steps in a process of registering associated-web page information in the associated-web page information registration unit 105, using the flow chart shown in FIG. 4. Unless specifically stated otherwise, the steps in this flow chart are controlled by the control unit 110.

The associated-web page information registration process is started by pressing the bookmark button 204 on the remote control 200, which is notified to the associated-web page information registration unit 105 through the user interface unit 102 and the bookmark request detecting unit 104.

Figure 7:
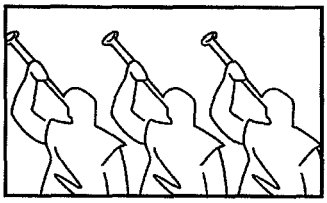
FIG. 7 is a diagram showing an example of a display screen in a web page of the TV receiver of the first embodiment of the present invention.

At this point, a web page like that shown in FIG. 7 is displayed on the monitor 310 by for example the web browser 103. The web page is displayed using ordinary web browser operations, such as the user designating the address using the remote control 200, clicking on a hyperlink in the web page, and so on.

For example, by pressing the bookmark button 204 of the remote control 200 in a state in which a desired web page has been displayed using a web browser capability that the TV receiver 100 of the present embodiment provides, the user can link and register the currently displayed web page and an arbitrary program.

First, in step S11 in FIG. 4, the associated-web page information registration unit 105 acquires web page information for a web page that is currently being displayed on the monitor 310 from the web page information acquisition unit 106.

Figure 8:
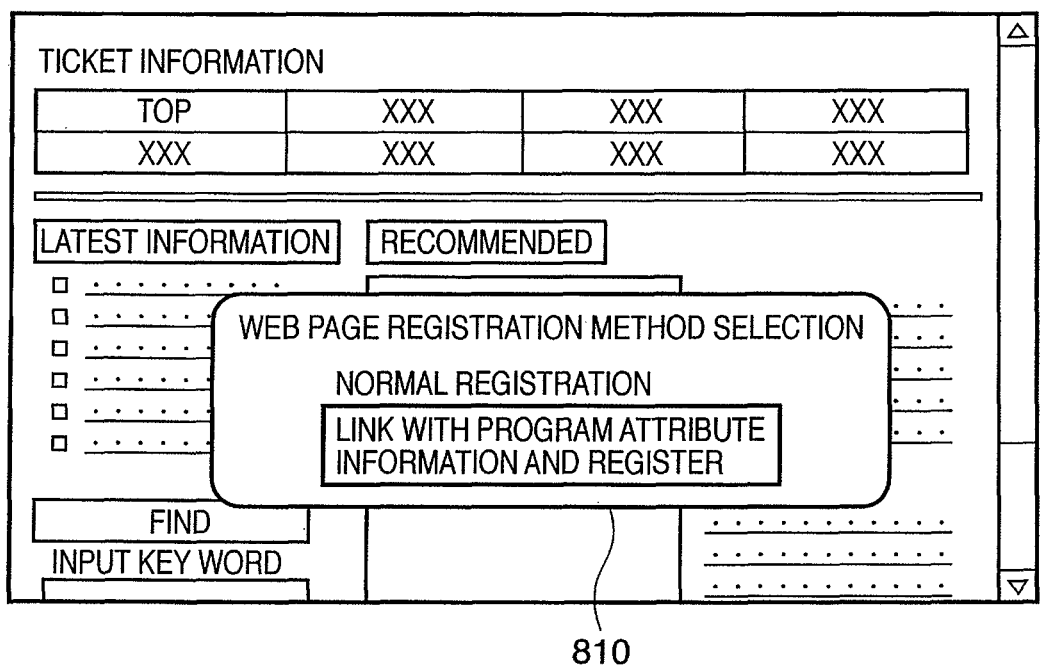
FIG. 8 is a diagram showing an example of a selection screen for selecting a web page registration method in the TV receiver of the first embodiment of the present invention.

In step S12, the control unit 110 displays a selection screen 810 for selecting a web page registration method like that shown in FIG. 8. In this embodiment, the web page registration method is selected from either a "link web page to program attribute information and register" method or a "register web page without linking to program attribute information (normal registration)" method.

Next, in step S13, the web page registration method selected and set with the selection screen 810 is identified. If "link web page to program attribute information and register" is chosen in step S13, processing then proceeds to step S14. If in step 13 "register web page without linking to program attribute information (normal registration)", processing then proceeds to step S22.

In step S22, the bookmark function of the web browser 103 is applied and only the information needed to browse to web page, such as the web page address and title information, is registered. Once normal registration processing for the web page in step S22 is finished, the web page registration process is ended.

Figure 9:
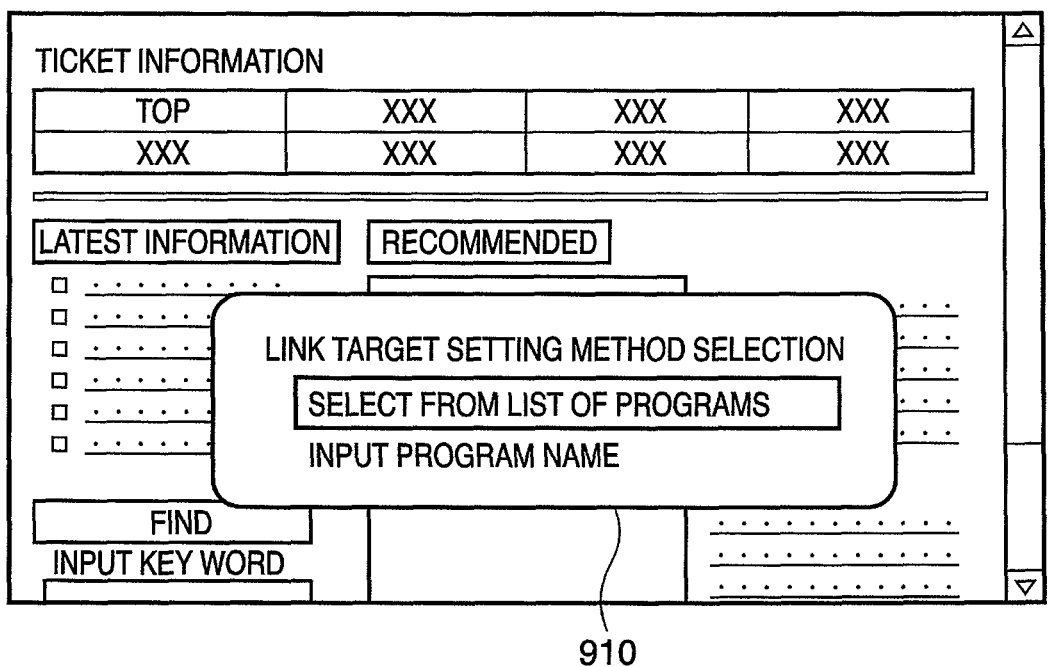
FIG. 9 is a diagram showing an example of a selection screen for selecting a method for setting linked information in the TV receiver of the first embodiment of the present invention.

In step S14, the control unit 110, having the capability to function as a second display means, displays on the web page a linked information setting method selection screen 910 like that shown in FIG. 9. In this embodiment, the program linked to the web page is selected using either a "select from a list of programs" method or an "input program name using text input" method.

In step S15, processing is bifurcated based on the linked information setting method selected and set using the selection screen 910. If "select from a list of programs" has been selected, processing then proceeds to step S16. If "input program name using text input" has been selected, processing then proceeds to step S18.

In step S16, the control unit 110 displays a program list screen 1010 like an EPG like that shown in FIG. 10 based on the information acquired from the program attribute information holding unit 108. In the program list screen 1010 shown in FIG. 10, the focus can be moved in units of programs, enabling the user to select a desired program using the cursor buttons 205a-205d on the remote control 200 and to designate the program using the set button 205e.

In step S17, the associated-web page information registration unit 105 determines whether or not a program to be linked to a web page has been designated by the user in step S16. If so, processing then proceeds to step S20. If not, processing returns to step S16.

Figure 11:
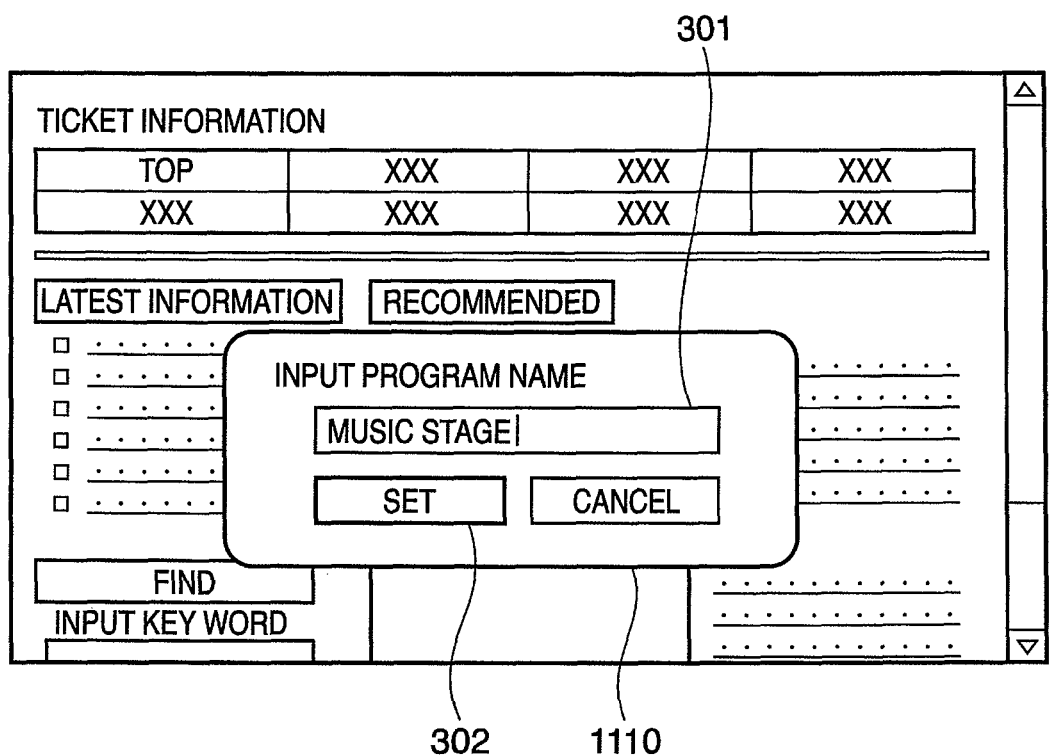
FIG. 11 is a diagram showing an example of a screen for inputting a program name in the TV receiver of the first embodiment of the present invention.

In step S18, the control unit 110 displays a program name input screen 1110 like that shown in FIG. 11. In the program name input screen 1110 shown in FIG. 11, the user can input the program name of the program to be linked to the web page in the text input area 301. There is no limitation on the method used to input text, and therefore a separate software keyboard may be displayed on the screen, or the numerical buttons 202 on the remote control 200 may be used and text input using the method used to carry out text input with mobile phones. It should be noted that, although no character type change button or kana-kanji conversion button is shown in FIG. 3, it is possible to provide the cursor buttons 205a to 205d and the set button 205e, for example, with these capabilities.

Once the user is finished inputting the program name, the user moves the focus to a set button 302 on the screen and presses the set button 205e on the remote control 200.

In step S19, the associated-web page information registration unit 105 determines whether or not the program name of the program to be associated with the web page has been set. If the associated-web page information registration unit 105 determines that the program name has been input, processing then proceeds to step S20. If not, processing returns to step S18.

In step S20, the associated-web page information registration unit 105 acquires the linked information associated with the web page from the linked information acquisition unit 107. If in step S15 "select from a list of programs" has been selected as the linked information setting method, the associated-web page information registration unit 105 acquires an ID that specifies the program from the linked information acquisition unit 107. On the other hand, if "input program name using text input" has been selected in step S15, the associated-web page information registration unit 105 acquires the text input in step S18.

In step S21, the associated-web page information registration unit 105 associates the web page information acquired in step S11 with the linked information acquired in step S20 and registers same in the associated-web page information holding unit 109.

FIG. 13 shows a specific example of associated-web page information held in the associated-web page information holding unit 109. The associated-web page information shown in FIG. 13 is in look-up table format that includes two general types of information: web page information and linked information. The web page information includes the web page address and web page title, and the linked information includes the link type, format and content. In the present embodiment, the type of link is "program". The format refers to the format of the linked contents. In the example shown in FIG. 13, where the linked content is an ID that specifies a program such as "OxDE", the format is "ID". If the linked content is a program name (text) such as "SNAP×SNAP" input in step S16, the format is "text".

Next, a description is given of a display process in the TV receiver of the present embodiment, with reference to FIG. 2. Functional blocks shown in FIG. 2 that are the same as those shown in FIG. 1 are given identical reference numerals and redundant description thereof is omitted.

A program status detecting unit 111 monitors the status of a program being received by the TV receiving unit 101 and detects a program currently being received. The program status detecting unit 111 then notifies information that specifies the program being received to an associated web page search unit 112.

The associated web page search unit 112, based on the information specifying the program notified from the program status detecting unit 111, acquires from the program attribute information holding unit 108 the program attribute information of the program being received. Then, based on the acquired program attribute information, the associated web page search unit 112 searches for any web page linked to the program being received in the associated-web page information held in the associated-web page information holding unit 109. A detailed description of this process is given later with reference to FIG. 5.

If it is determined by the associated web page search unit 112 that an associated web page linked to the program being received does exist, an associated-web page notification/display unit 113 accesses that associated web page through the web browser 103 and displays it on the monitor 310. A detailed description of this process is given later with reference to FIG. 6.

Figure 5:
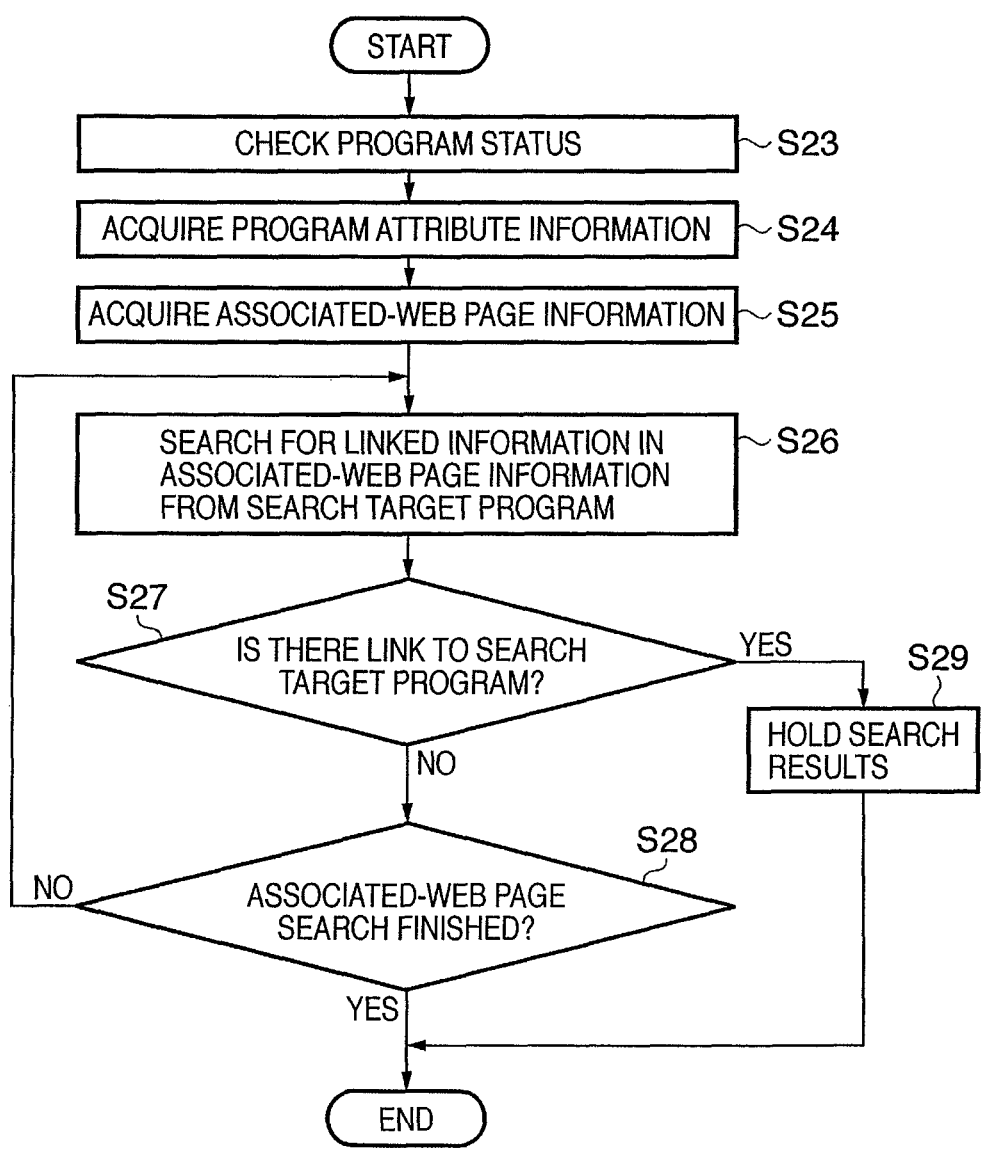
FIG. 5 is a flow chart illustrating steps in a process of searching for an associated web page in the TV receiver of the first embodiment of the present invention.

A description is now given of steps in a process of searching for an associated web page as carried out in the associated web page search unit 112, using the flow chart shown in FIG. 5. Unless specifically described otherwise, the steps in this flow chart are controlled by the control unit 110.

The associated web page search process is executed when starting television viewing or when a channel selection process is generated.

In step S23, the associated web page search unit 112 acquires information specifying the program being received from the program status detecting unit 111.

In step S24, the associated web page search unit 112 acquires program attribute information for the program being received from the program attribute information holding unit 108.

In step S25, the associated web page search unit 112 acquires associated-web page information from the associated-web page information holding unit 109. The associated-web page information is information in the table format described using FIG. 13. It should be noted that it is not always necessary that the associated web page search unit 112 acquire associated-web page information. The associated-web page information is information stored on a storage medium, not shown, and therefore the associated web page search process described below can also be executed by accessing such storage medium.

In step S26, the control unit 110 uses the program attribute information for the program being received acquired from the program attribute information holding unit 108 to search for linked information contained in the associated-web page information.

In step S27, it is determined from the results of the search conducted in step S26 whether or not an associated web page for the program being received is set. Determining whether or not an associated web page for the program being received is set can be accomplished by determining whether or not there is linked information relevant to the acquired program attribute information. If it is determined that such linked information does exist, processing then proceeds to step S29. If it is determined that relevant linked information does not exist, processing then proceeds to step S28.

In step S28, it is determined whether or not the search of all the associated-web page information held in the associated-web page information holding unit 109 is finished. If it is determined that the search is not finished, processing returns to step S26. If it is determined that processing is finished, the associated web page search process is ended. In step S29, the associated-web page information for the program being received is held as search results.

Figure 6:
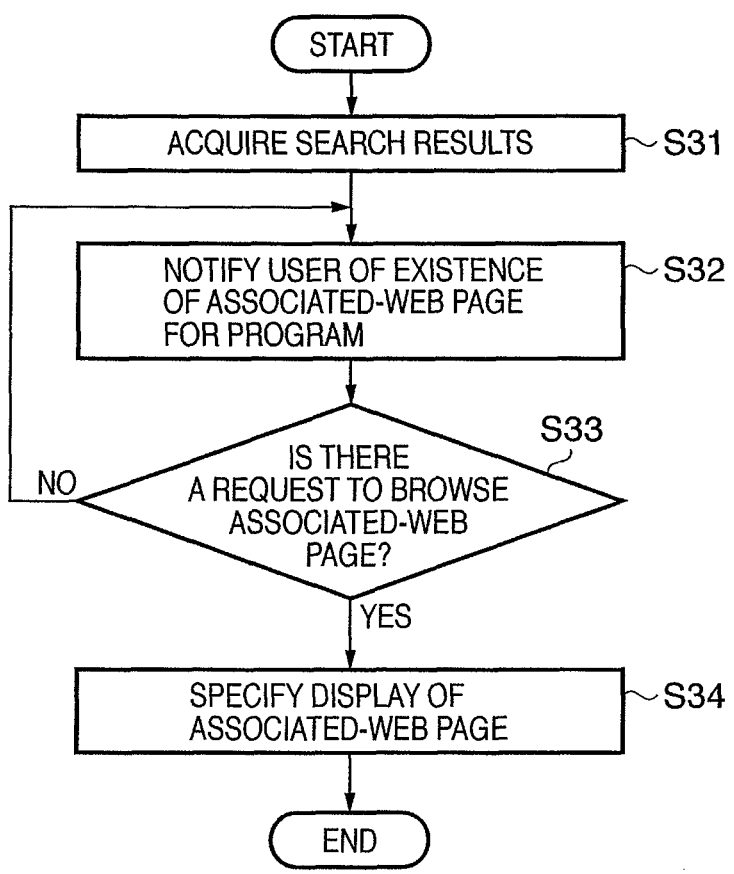
FIG. 6 is a flow chart illustrating steps in a process of notifying and displaying an associated web page in the TV receiver of the first embodiment of the present invention.

Next, a description is given of the process of notifying and displaying an associated web page conducted by the associated-web page notification/display unit 113, using the flow chart shown in FIG. 6.

The associated web page notification/display process is executed when there is an associated web page for the program being received.

In step S31, the associated-web page notification/display unit 113 acquires the associated-web page information stored in the associated web page search unit 112 in step S29 shown in FIG. 5.

Figure 14:
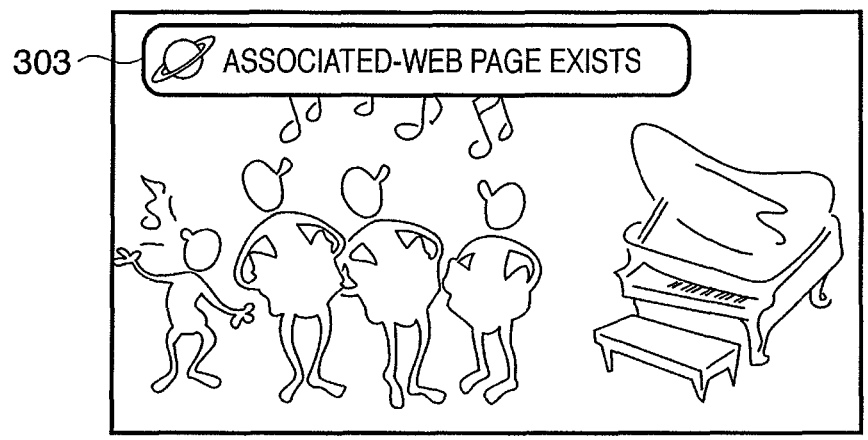
FIG. 14 is a diagram showing an example of a screen for notifying the existence of a web page associated with a program being received in the TV receiver of the first embodiment of the present invention.
Figure 15A:
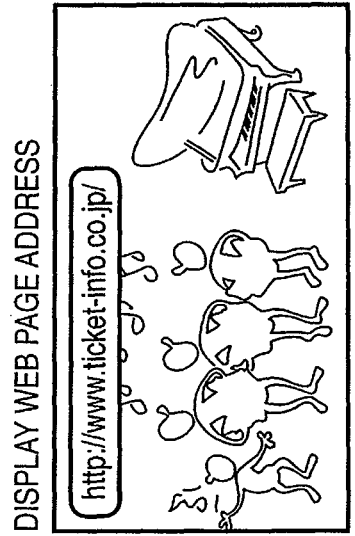
FIGS. 15A to 15D are diagrams showing other examples of screens for notifying the existence of a web page associated with a program being received of the TV receiver of the first embodiment of the present invention.
Figure 15B:
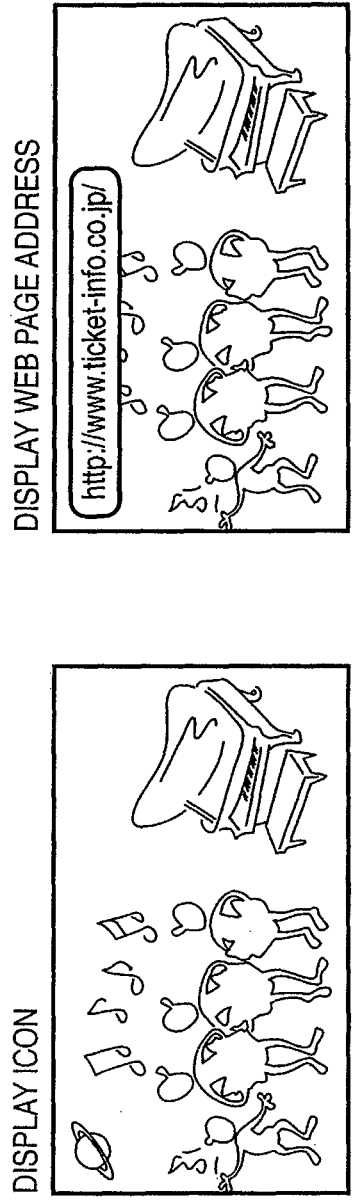
Figure 15C:
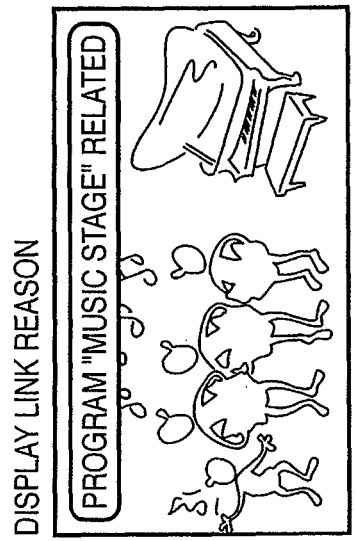

In step S32, as shown by the notification dialog box 303 shown in FIG. 14, notification that an arbitrary web page linked to the program being received and registered exists is, for example, displayed on the monitor 310 on top of the image of the program. It should be noted that notification of the existence of an associated web page may be by information like that shown in FIGS. 15A to 15D. In the example shown in FIG. 15A, an icon is displayed. In the example shown in FIG. 15B, a web page title such as "ticket information" is displayed. It should be noted that the user is permitted to display a web page title editing screen like that shown in FIG. 12 and to edit the title of the web page included in the associated-web page information between steps S20 and S21 shown in FIG. 4. In that case, the title of the web page displayed in FIG. 15B becomes the title after editing. In the example shown in FIG. 15C, web page address information (URL) such as "http://www.ticket-info.co.jp/" is displayed.

Figure 15D:
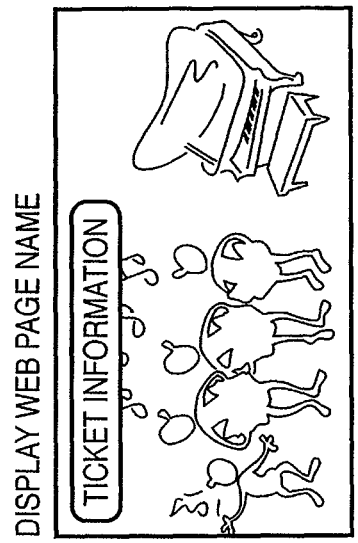

In the example shown in FIG. 15D, linked information content such as "program 'music stage'-associated" is displayed.

In step S33, the associated-web page notification/display unit 113 determines whether or not an associated web page browse request has been input from the user interface unit 102. If it is determined that such a request has been input, processing then proceeds to step S34. If it is determined that such a request has not been input, processing returns to step S32.

Figure 17:
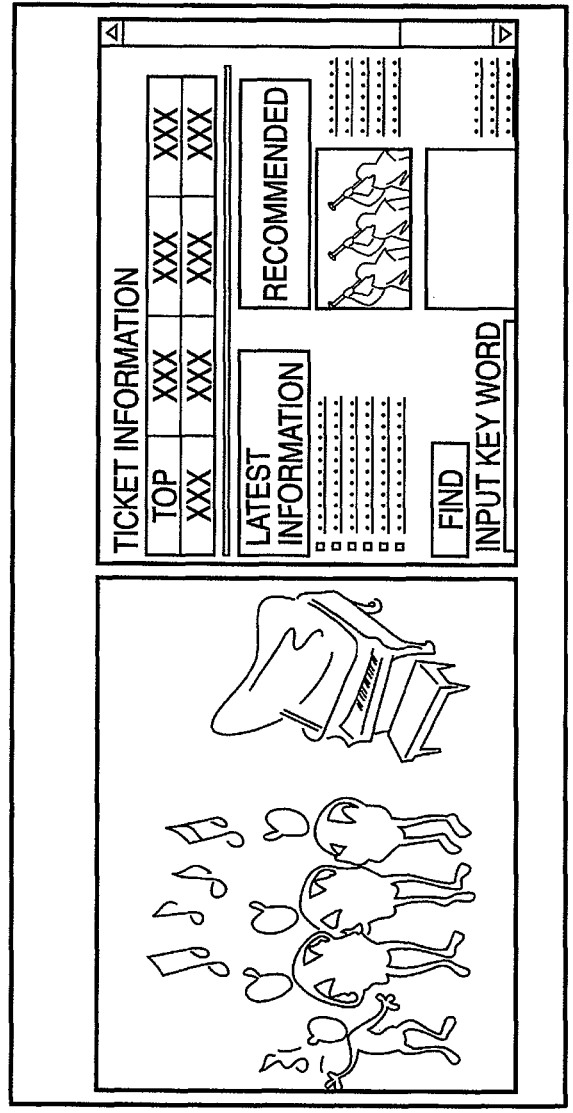
FIG. 17 is a diagram showing an example of displaying the associated web page on a separate screen from that of the program being received in the TV receiver of the first embodiment of the present invention.

In step S34, if the user has input an associated web page browse request, the associated-web page notification/display unit 113 executes a process that displays the web page through the web browser 103. Specifically, the associated-web page notification/display unit 113 transmits the web page address information contained in the associated-web page information to the web browser 103 and requests display of the associated web page. The web browser 103, with the web page address information inputted, accesses the web server specified by such address information and at the same time displays the web page rendered based on the acquired HTML file on the monitor 310 in such a way that the web page is visible to the user. It should be noted that the associated-web page information may be displayed using the full screen of the monitor 310 as shown in FIG. 7 or displayed using a separate window from that of the program as shown in FIG. 17.

In addition, matters may be arranged so that a confirmation screen like that shown in FIG. 16 is displayed prior to executing display of the associated web page in step S34, and the associated web page displayed after obtaining the user's consent. Further, although in the foregoing display process the display of the web browser 103 is carried out after input of a web page display instruction from the user once the existence of an associated web page is notified to the user, alternatively, matters may be arranged so that the associated web page is displayed automatically when an associated web page exists.

Thus, as described above, the first embodiment of the present invention enables the user to link and register a desired web page with a desired program. Moreover, whenever there is a web page associated with a program being viewed, the user is notified of that fact or the associated web page is automatically displayed. As a result, the user not only no longer forgets that there is an associated web page linked with the program and registered, but also is able to display that associated web page with a simple operation.

In addition, for the web page registration method the user can choose between either a "link web page to program attribute information and register" method or a "register web page without linking to program attribute information (normal registration)" method, which makes it possible to provide a web page registration (bookmark) method suited to the user's desires.

Second Embodiment

In the first embodiment of the present invention a description was given of an instance in which the type of link is that of a program (that is, information that makes it possible to specify a program). By contrast, in a second embodiment of the present invention a description is given of an instance in which the type of link is that of a key word or a cast member. The configuration of the TV receiver of the present embodiment may be the same as that described using FIG. 1 and FIG. 2. Therefore, a description thereof is omitted and the following description is that of the distinctive operation of the second embodiment.

Figure 18:
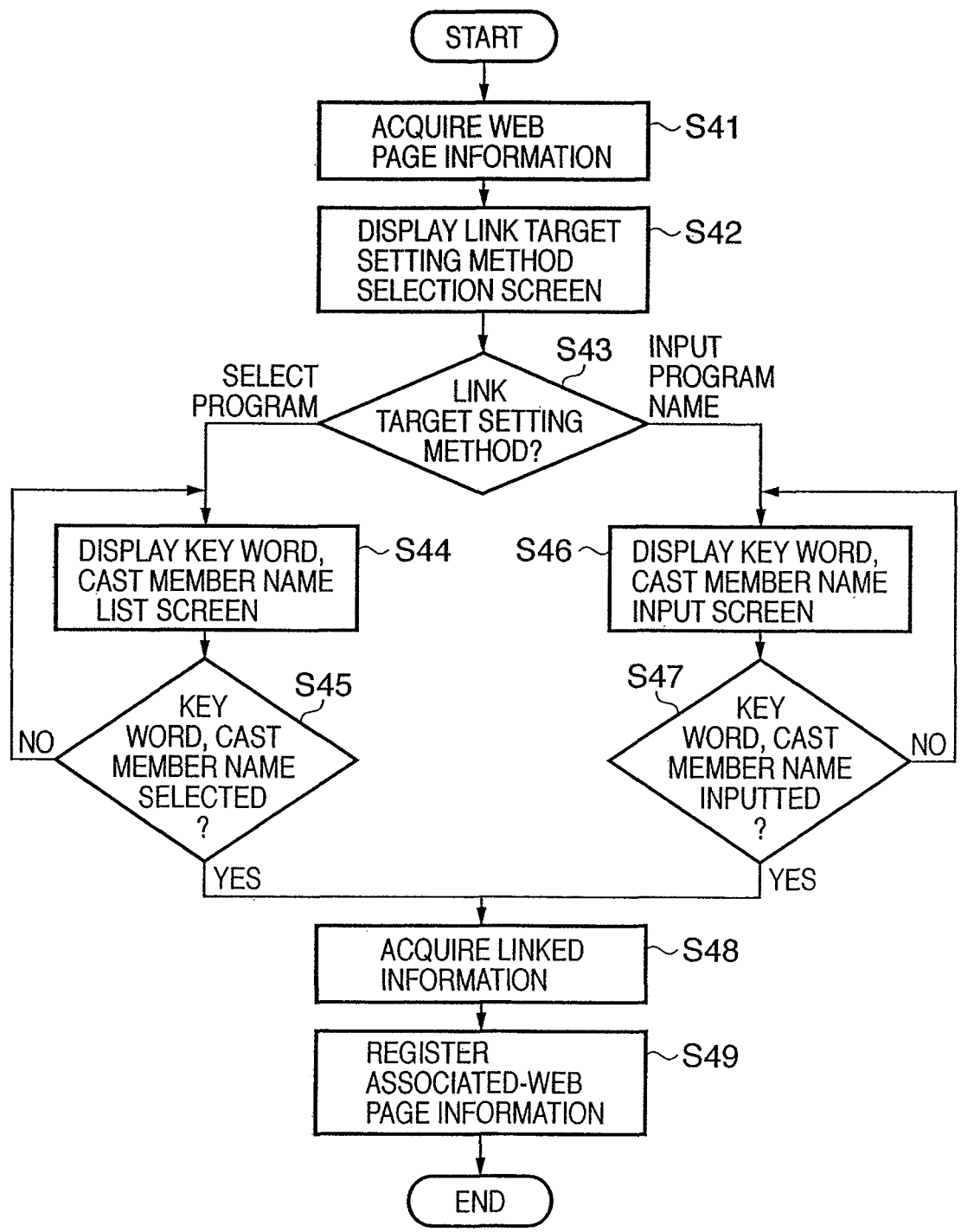
FIG. 18 is a flow chart illustrating steps in the process of registering associated-web page information in a TV receiver according to a second embodiment of the present invention.

A description is now given of steps in a process of registering an associated web page in the associated-web page information registration unit 105, using the flow chart shown in FIG. 18.

In step S41, the same processing as that of step S11 in FIG. 4 is carried out.

In step S42, the control unit 110 displays a selection screen, like those shown in FIG. 19A or FIG. 19B, for selecting a method of setting the linked information. FIG. 19A shows a selection screen when selecting either a "select from a list of key words" method or an "input a key word using text input" method to set the link associated with the web page. FIG. 19B shows a selection screen when selecting either a "select from a list of cast member names" method or an "input a cast member name using text input" method to set the link associated with the web page. Matters may be arranged so that the user can set which of these selection screens is displayed in step S42. Of course, it is also possible to arrange matters so as to switch display between the selection screen shown in FIG. 19A and the selection screen shown in FIG. 19B. Moreover, step S12 and step S13 shown in FIG. 4 may be executed prior to the screen display of step S42.

In step S43, processing is bifurcated based on the linked information setting method selected in step S42. When either the "select from a list of key words" method or the "select from a list of cast member names" method is selected, processing proceeds to step S44. When either the "input a key word using text input" method or the "input a cast member name using text input" method is selected, processing proceeds to step S46.

In step S44, the control unit 110 displays a key word list screen like that shown in FIG. 20A or a cast member name list screen like that shown in FIG. 20B. The user moves the focus in the key word list screen or the cast member name list screen shown in FIG. 20A and FIG. 20B and selects either a key word or a cast member name to associate with the web page.

It should be noted that the movement of the focus is accomplished using the cursor buttons 205*a*-205*d* on the remote control 200 as shown for example in FIG. 3, with selection accomplished using the set button 205*e* on the remote control 200. The key words and the cast member names displayed as menu selections on the key word list screen or the cast member name list screen are already provided, either stored in advance in the TV receiver, extracted from the program attribute information, or registered in advance by the user.

In step S45, the associated-web page information registration unit 105 determines whether or not a key word or a cast member name to associate the web page has been selected in step S44. If so, processing then proceeds to step S48; if not, processing returns to step S44.

Figure 21A:
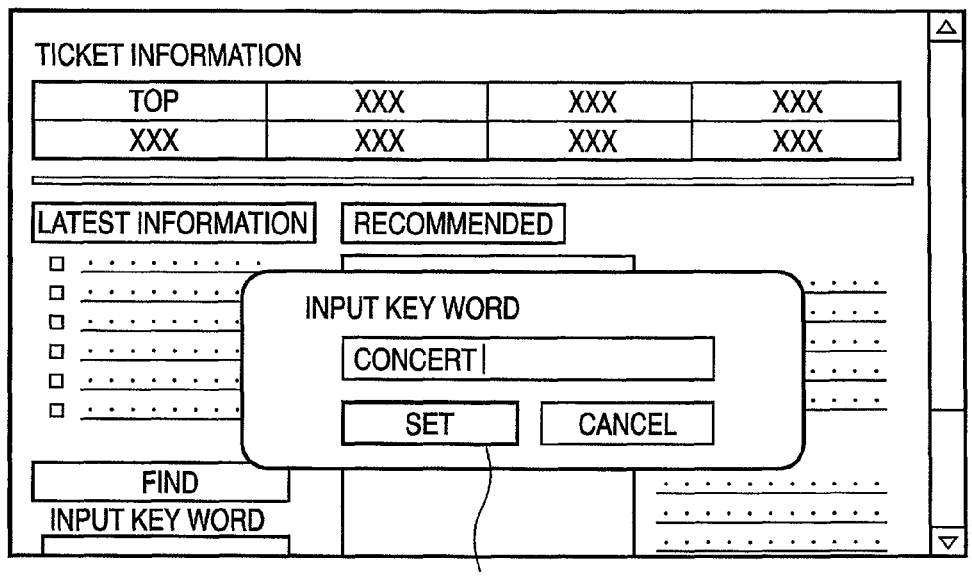
FIGS. 21A and 21B are diagrams showing examples of input screens for inputting a key word or a cast member name in the TV receiver of the second embodiment of the present invention.
Figure 21B:
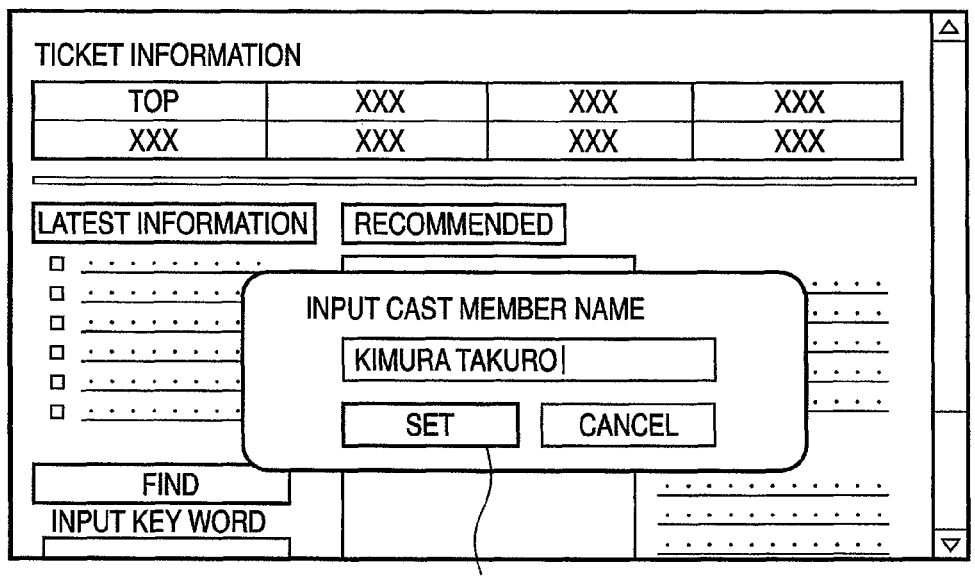

In step S46, the control unit 110 displays a key word input screen like that shown in FIG. 21A or a cast member name input screen like that shown in FIG. 21B. The user can then input a key word or a cast member name to associate the web page in the text input area the key word input screen or the cast member name input screen shown in FIG. 21A or FIG. 21B. Once input of the key word or the cast member name is finished, the user moves the focus to the set button 211 on the screen using the cursor buttons 205*a*-205*d* and selects using the set button 205*e*.

In step S47, the associated-web page information registration unit 105 determines whether or not a key word or a cast member name that associates the web page has been input in step S46. If so, processing then proceeds to step S48; if not, processing returns to step S46.

In step S48, the text of the key word or the cast member name text-inputted as linked information is saved in a storage unit.

In step S49, the associated-web page information registration unit 105 generates associated-web page information associating the text stored in step S48 and the web page information acquired in step S41. The associated-web page information is data in a table format like that shown in FIG. 22. Then, this associated-web page information is registered in the associated-web page information holding unit 109. In the example shown in FIG. 22, the type of link is "key word" or "cast member name", and the link format is "text".

Thus, as described above, the second embodiment of the present invention enables the user to associate a desired web page with a desired key word or cast member name and register. As a result, the user can ascertain the existence of an associated web page linked with a key word or a cast member that he or she wishes to browse while viewing a program, and moreover can display that associated web page with a simple operation.

It should be noted that the method of displaying the web page using the registered associated-web page information in this second embodiment involves the same process as the display process steps of the first embodiment described above. The present embodiment acquires the attribute information, such as cast members and key words, of the program being viewed by the user and uses that attribute information to search for and display an associated web page. By contrast, the first embodiment uses program ID and program name to search for and display the associated web page.

Third Embodiment

Whereas in the first embodiment a description is given of an arrangement in which the link is a program, in a third embodiment of the present invention a description is given of an arrangement in which the link is a genre or a channel.

Figure 23:
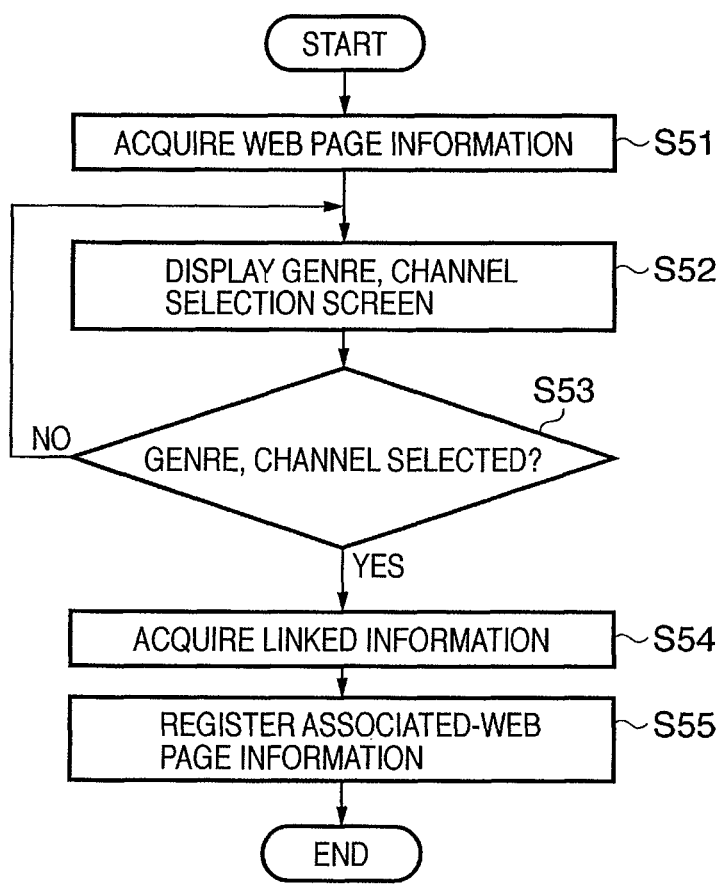
FIG. 23 is a flow chart illustrating steps in the process of registering associated-web page information in a TV receiver of a third embodiment of the present invention.

A description is now given of steps in a process of registering an associated web page in the associated-web page information registration unit 105, using the flow chart shown in FIG. 23.

In step S51, the same process as that of step S11 shown in FIG. 4 is carried out.

In step S52, the control unit 110 displays a genre list screen or a channel list screen like those shown in FIG. 24A or FIG. 24B. On the genre list screen or the channel list screen shown in FIG. 24A and FIG. 24B the user moves the focus to a desired genre or channel and selects the genre or channel to be associated with the web page. Additionally, the processing of from step S12 to step S13 shown in FIG. 4 may be executed prior to the screen display of step S52.

It should be noted that the movement of the focus is accomplished using the cursor buttons 205*a*-205*d* on the remote control 200 as shown for example in FIG. 3, with selection accomplished using the set button 205*e* on the remote control 200. The genres or the channels shown as menu selections on the genre list screen or the channel list screen are stored in the apparatus, by storage in advance in the TV receiver 100, extraction from the program attribute information, or the like.

In step S53, the associated-web page information registration unit 105 determines whether or not a genre or a channel that is to be associated with the web page is selected. If it is determined that a genre or channel has been selected, processing then proceeds to step S54; if not, processing returns to step S52.

In step S54, the associated-web page information registration unit 105 acquires from the linked information acquisition unit 107 an ID that specifies the genre or the channel as the linked information. It should be noted that the ID that specifies the genre or the channel is an ID that the program attribute information holding unit 108 acquires from the program attributes. Therefore, the information shown on the genre list screen and the channel list screen can be generated based on the information held in the program attribute information holding unit 108. In other cases, in which the ID that specifies the genre or the channel is determined by broadcast regulations, the same processing can be implemented without acquisition from the program attribute information by storing the ID in the TV receiver 100 in advance.

In step S55, the associated-web page information registration unit 105 associates the ID acquired in step S54 and the web page information acquired in step S51 and generates associated-web page information. The associated-web page information is data in a table format like that shown in FIG. 25. The associated-web page information is then registered in the associated-web page information holding unit 109. In the example shown in FIG. 25, the type of link is "genre" or "channel", and the link format is "ID".

Thus, as described above, the third embodiment of the present invention enables the user to associate a desired web page and a desired genre or channel and register them. As a result, the user can be notified of the existence of a web page desired to be browsed in conjunction with the genre or the channel during program viewing, and moreover, can display the associated web page with a simple operation.

It should be noted that the method of displaying the web page using registered associated-web page information in the third embodiment involves the same processing as the display process steps of the first embodiment described above. The third embodiment differs from the first embodiment insofar as it acquires such attribute information as genre and channel of the program that the user is viewing, and searches for and displays an associated web page using that attribute information.

Fourth Embodiment

In the first through third embodiments of the present invention, descriptions are given of cases in which, in the case of a program, the linked information that is associated with the web page is a key word or a cast, or the linked information is a genre or a channel. In a fourth embodiment of the present invention, a description is given of a case in which the linked information is a combination of the first through third embodiments (program, key word, cast, genre, and channel).

Figure 26:
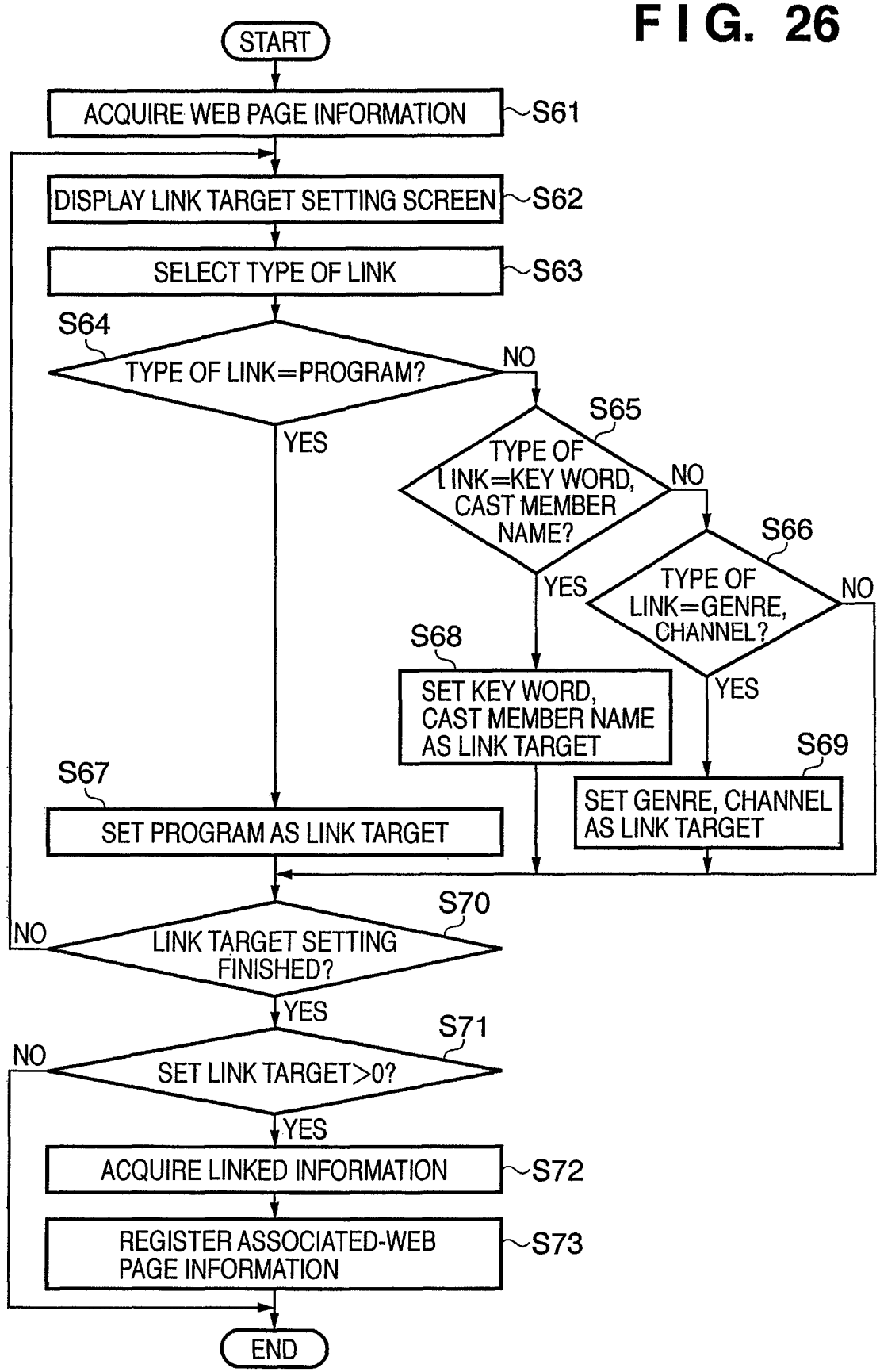
FIG. 26 is a flow chart illustrating steps in the process of registering associated-web page information in a TV receiver of a fourth embodiment of the present invention.

A description is now given of steps in a process of registering associated-web page information in the associated-web page information registration unit 105, using the flow chart shown in FIG. 26.

In step S61, the same process as that of step S11 in FIG. 4 is carried out.

In step S62, the control unit 110 displays a linked information setting screen like that shown in FIG. 27. Step S12 and step S13 shown in FIG. 4 may be executed prior to the screen display of step S62.

In step S63, the associated-web page information registration unit 105 awaits the user's selection of the type of link to be associated with the web page from among the types of links displayed in the selection area 304 on the linked information setting screen displayed in step S62. The user selects the type of link using the cursor buttons 205a-205d and the set button 205e on the remote control 200.

In steps S64 to 366, the type of link selected in step S63 is identified.

In step S64, the associated-web page information registration unit 105 determines whether or not the selected type of link is a program. If it is determined that the selected type of link is a program, processing then proceeds to step S67. If it is determined that the selected type of link is not a program, processing then proceeds to step S65.

In step S65, the associated-web page information registration unit 105 determines whether or not the selected type of link is a key word or a cast member. If it is determined that the selected type of link is a key word or a cast member, processing then proceeds to step S68. If it is determined that the selected type of link is neither a key word nor a cast member, processing then proceeds to step S66.

In step 366, the associated-web page information registration unit 105 determines whether or not the selected type of link is a genre or a channel. If it is determined that the selected type of link is a genre or a channel, processing then proceeds to step S69. If it is determined that the selected type of link is neither a genre nor a channel, processing then proceeds to step S70.

In step S67, the associated-web page information registration unit 105 carries out a process of setting the program as the linked information. This process is the same as that carried out in steps S12 to S19 shown in FIG. 4.

In step S68, the associated-web page information registration unit 105 carries out a process of setting the key word or the cast member as the linked information. This process is the same as that carried out in steps S42 to S47 shown in FIG. 18.

In step S69, the associated-web page information registration unit 105 carries out a process of setting the genre or the channel as the linked information. This process is the same as that carried out in steps S52 to S53 shown in FIG. 23.

It should be noted that, in steps S67 to S69, linked information setting candidates are shown in a setting area 305 shown in FIG. 27. In FIG. 27, "genre" is selected as the type of link, and therefore different types of genres that can be set are displayed as setting candidates in the setting area 305. The user can then select any genre from among the genre types that are displayed in the setting area 305.

In step S70, the associated-web page information registration unit 105 determines whether or not there is a termination request to end the setting of the linked information. If the associated-web page information registration unit 105 determines that there is such a termination request, processing then proceeds to step S71. If the associated-web page information registration unit 105 determines that there is no termination request, processing returns to step S62 and the process of setting the linked information is repeated.

In step S71, the associated-web page information registration unit 105 determines whether or not there are one or more pieces of linked information that have been set. If the associated-web page information registration unit 105 determines that there are one or more pieces of set linked information, processing then proceeds to step S72. If the associated-web page information registration unit 105 determines that there is not even one of set linked information, the associated-web page information registration process is ended.

In step S72, the associated-web page information registration unit 105 acquires linked information matched with each type of link. If the type of link is a program, the associated-web page information registration unit 105 either acquires the ID that specifies the program or stores a text that indicates the name of the program. If the type of link is a key word or a cast member name, the associated-web page information registration unit 105 stores the key word or the text that indicates the cast member name. If the type of link is a genre or a channel, the associated-web page information registration unit 105 acquires the ID that specifies the genre or the channel from the linked information acquisition unit 107.

In step S73, the associated-web page information registration unit 105 generates associated-web page information from the information acquired in step S72 and the web page information acquired in step S71. The associated-web page information is data in a table format like that shown in FIG. 28. This associated-web page information is then held in the associated-web page information holding unit 109. In the example shown in FIG. 28, three types of linked information, program, key word, and cast, are associated with a web page having the address http://www.ticket-info.co.jp. As a result, if a program matches any of these three set pieces of linked information, the associated web page can be browsed.

Thus, as described above, the fourth embodiment enables the user to associate and register one desired web page with a plurality of linked information from among a desired program, key word, cast member name, genre, or channel.

It should be noted that the method of displaying the web page using registered associated-web page information in the fourth embodiment involves the same processing as the display process steps of the first embodiment described above. Moreover, as with the first embodiment and the second embodiment, the associated web page is displayed based on attribute information for the program that the user is viewing such as the channel, cast, key word, genre and so forth.

Fifth Embodiment

In the first through fourth embodiments, a description was given of a web page being browsed (being displayed on the monitor 310) set as an associated web page. In a fifth embodiment of the present invention, a description is given of setting a web page selected from a list of pre-registered web pages as an associated web page.

Figure 29:
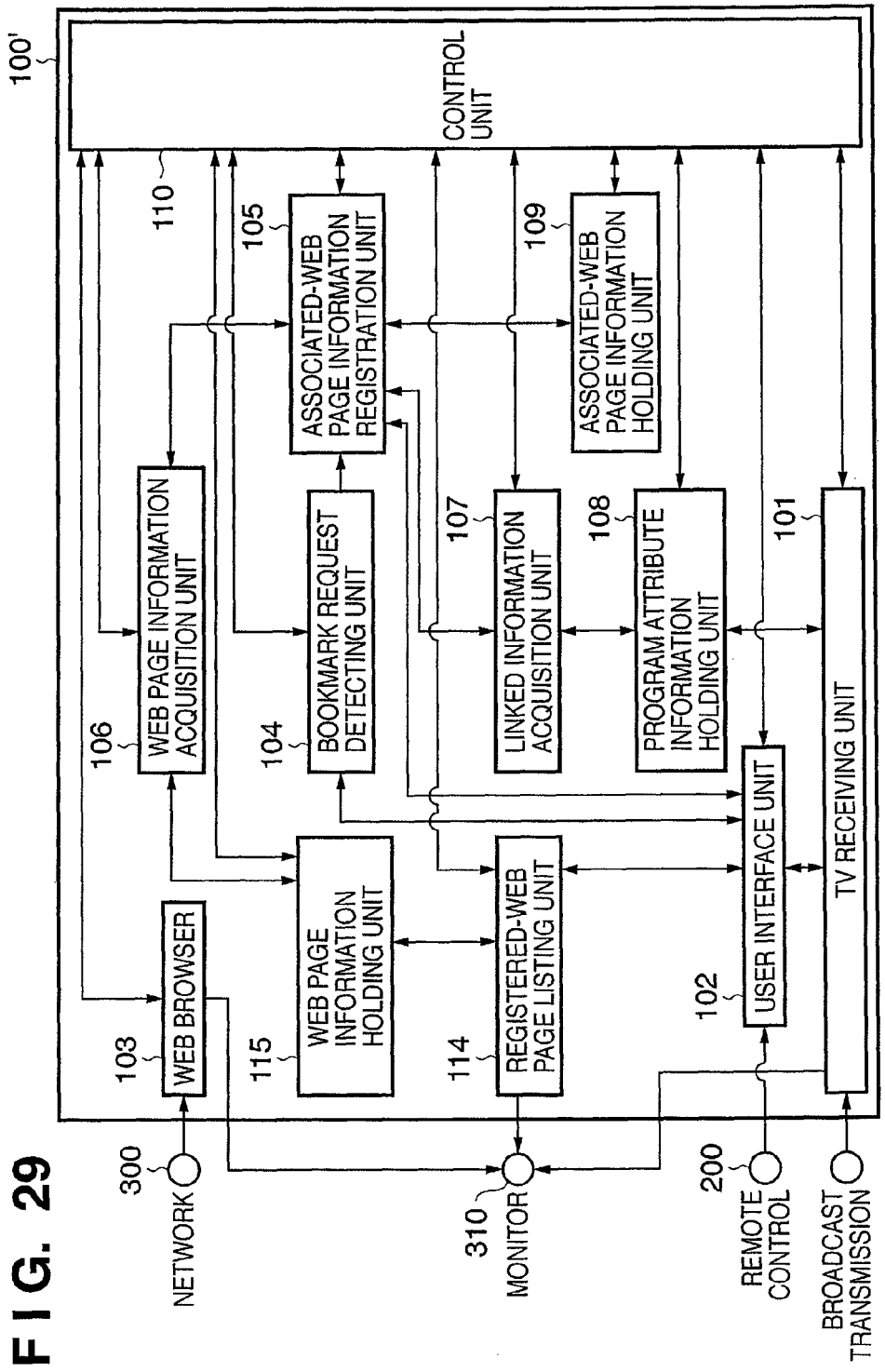
FIG. 29 is a block diagram showing a configuration pertaining to a web page registration process in a TV receiver as one example of a web information processing apparatus according to a fifth embodiment of the present invention.

FIG. 29 is a block diagram showing a configuration pertaining to a web page registration process in a TV receiver according to the present embodiment. In other words, FIG. 29 is also a block diagram showing a configuration of a web information registration apparatus according to the present embodiment. In FIG. 29, blocks having the same function as those shown in FIG. 1 described in the first embodiment are given the same reference numerals and a description thereof is omitted. As can be seen from a comparison of FIG. 1 and FIG. 29, the TV receiver of the present embodiment adds a registered-web page listing unit 114 and a web page information holding unit 115 to the TV receiver of the first embodiment.

The registered-web page listing unit 114 displays on the monitor 310 a list of registered web pages like that shown in FIG. 31 based on web page information being held in the web page information holding unit 115.

The web page information holding unit 115 holds web page information registered in advance by the user based on web page information acquired from the web browser 103.

Figure 30:
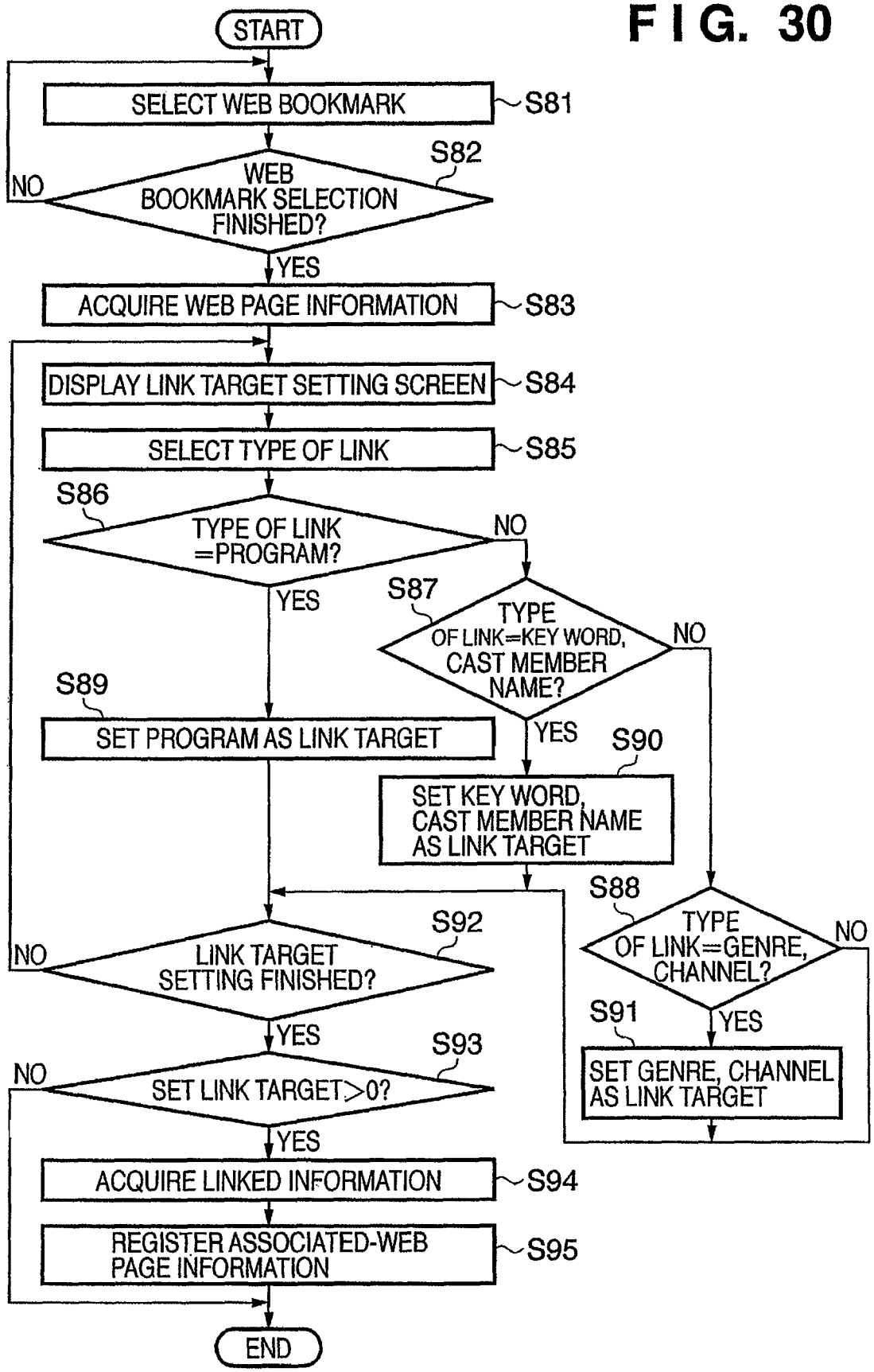
FIG. 30 is a flow chart illustrating steps in the process of registering associated-web page information in the TV receiver of the fifth embodiment of the present invention.

A description is now given of steps in an associated-web page information registration process conducted by the associated-web page information registration unit 105, using the flow chart shown in FIG. 30.

The web page information registration process starts from a state in which a selection screen like that shown in FIG. 32 is displayed on the monitor 310. This selection screen is displayed when the bookmark button 204 on the remote control 200 is pressed by the user when a list of registered web pages like that shown in FIG. 31 is displayed by the registered-web page listing unit 114.

In step S81, the associated-web page information registration unit 105 awaits the user's selection of the web page to be associated with the linked information from the list of titles of web pages displayed in a selection area 307 in the screen shown in FIG. 32. By moving the focus to the title of the web page displayed in the selection area 307 and selecting it, the user can set that web page as the associated web page. Once the user finishes selecting the web page to be set as the associated web page, the user moves the focus to a set button 308 on the screen and selects.

In step S82, the associated-web page information registration unit 105 determines whether or not the web page selected in step S81 has been set. If the associated-web page information registration unit 105 determines that the set button 308 has been pressed, processing then proceeds to step S83. If the associated-web page information registration unit 105 determines that the set button 308 has not been pressed, processing returns to step S81.

In step S83, the associated-web page information registration unit 105 acquires the web page information of the web page selected by the user in step S81 from the web page information acquisition unit 106. The web page information acquisition unit 106 acquires the web page information from the web page information holding unit 115.

Steps S84 to S94 carry out the same processes as those of steps S62 to S72 shown in FIG. 26 and described in the fourth embodiment described above.

In step S95, the associated-web page information registration unit 105 generates associated-web page information from the information acquired in step S94 and the web page information acquired in step S83. The associated-web page information is data in a table format like that shown in FIG. 33. This associated-web page information is then registered in the associated-web page information holding unit 109. In the example shown in FIG. 33, three types of linked information, genre, cast and channel, are associated with two web pages with addresses http://www.ticket-info.co.jp and http://mmtv.co.jp/bbs/snap. Thus, if a program matches any of these three pieces of linked information, it is possible to browse the two associated web pages.

Thus, as described above, in the fifth embodiment the user associates and registers multiple desired web pages with desired linked information. As a result, even when there are multiple web pages that the user wishes to link with linked information and browse, the user can be notified of the existence of associated web pages that the user wishes to link with linked information and browse, and further, multiple web pages can be linked with linked information and displayed. In addition, web pages that have already been registered using the web browser 103 bookmark function also can be freely associated with programs and with such attribute information as channel, genre and so forth, and registered.

It should be noted that associating a plurality of pieces of linked information with one or a plurality of desired web pages is described in the fourth embodiment and the fifth embodiment described above. In these embodiments, whenever the program that the user is viewing matches the conditions of any one of the plurality of pieces of linked information, the associated web page is displayed. However, alternatively, matters may be configured so that the associated web page is displayed only when the program matches all the conditions of the plurality of pieces of linked information.

Sixth Embodiment

In the first embodiment of the present invention a description is given of a case in which there is one associated web page to be displayed. However, in a sixth embodiment of the present invention, a description is given of a case in which there are multiple associated web pages to be displayed. This is a display method adapted to a case in which multiple web pages are associated with a given piece of linked information as with the fifth embodiment.

It should be noted that the present display method is executed by the associated web page notification/display unit 113 shown in FIG. 2. A description is now given of steps in the associated web page information notification/display process of the present embodiment, using the flow chart shown in FIG. 34.

Steps S101 to S103 carry out the same processes as those of steps S31 to S33 shown in FIG. 6 and described as the first embodiment, and step S106 carries out the same process as that of step S34 shown in FIG. 6. Therefore, a description is given here only of the processes of steps S104 to S105.

In step S104, the associated-web page notification/display unit 113 displays a list of registered associated web pages, not shown, on the monitor 310.

In step S105, the associated-web page notification/display unit 113 determines whether or not the user has selected a web page from the displayed list of associated web pages. If the associated-web page notification/display unit 113 determines that the user has selected a web page, processing then proceeds to step S106. If the associated-web page notification/display unit 113 determines that the user has not selected a web page, processing returns to step S104.

Thus, as described above, the sixth embodiment, by displaying a list of associated web pages, enables the user to select a web page with ease even when there are multiple program-associated web pages and to display a web page that the user wishes to browse.

It should be noted that, in the sixth embodiment described above, of the plurality of web pages, one web page is selected and displayed. Alternatively, however, a plurality of web pages may be displayed. One method of displaying a plurality of web pages involves displaying a plurality of windows for web page display corresponding to the plurality of web pages. In other words, by further providing the web page area shown in FIG. 17, when for example displaying two web pages, a total of three display areas consisting of the program display area and the two web page display areas may be provided in the display screen on the monitor.

Another possible method involves making the web browser a tab browser and switching tabs based on user instruction so as to make the plurality of web pages displayable. A tab browser is a browser that links each web page to a tab button provided in the window in order to display a plurality of pages in a single window. A typical tab browser is the Opera browser software developed by Opera Software ASA of Norway. With this method, a plurality of web pages can be displayed simply by providing the two areas shown in FIG. 17, that is, the program display area and the web page display area, inside the display screen of the monitor.

Seventh Embodiment

In the first through sixth embodiments, a description is given of searching for an associated web page for a program being viewed. In a seventh embodiment of the present invention, a description is given of searching for an associated web page for a program for which program attribute information has been acquired in advance.

Figure 35:
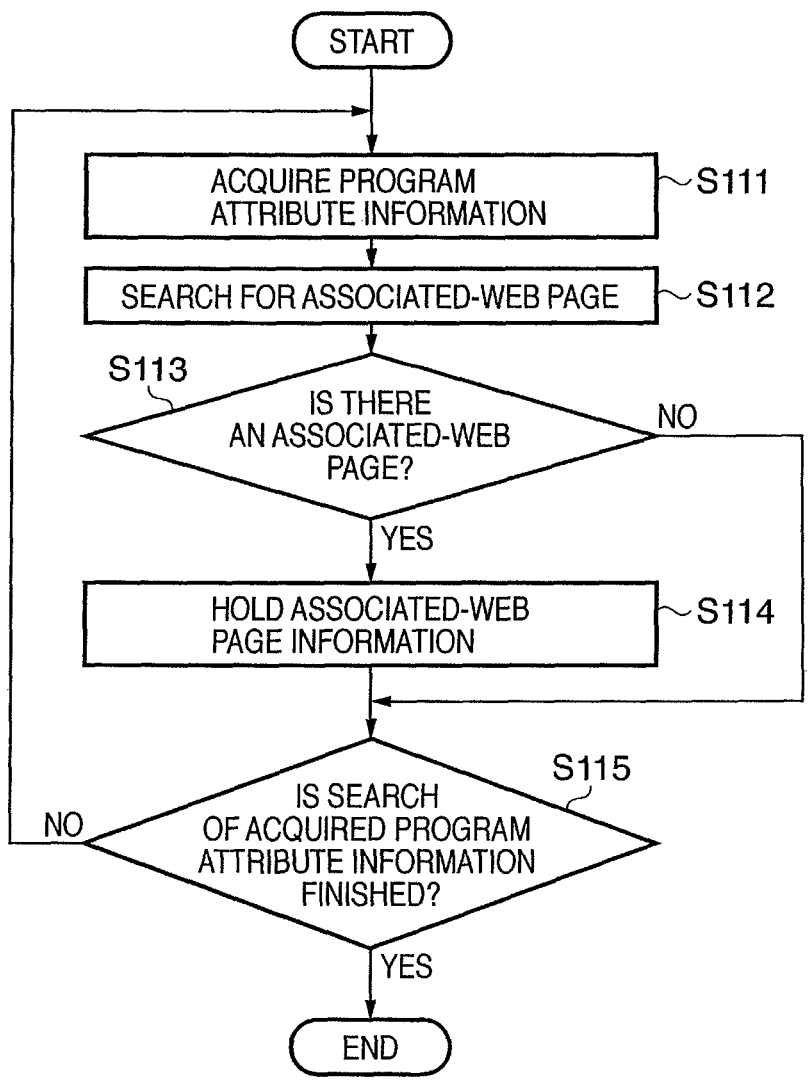
FIG. 35 is a flow chart illustrating steps in the process of searching for an associated web page performed by an associated web page search unit 112 of a TV receiver of a seventh embodiment of the present invention.

A description is now given of steps in a process of searching for an associated web page conducted by an associated web page search unit 112 of the TV receiver of the present embodiment, using the flow chart shown in FIG. 35.

In step S111, at predetermined times program attribute information held in the program attribute information holding unit 108 is acquired. In this case, predetermined times means regular times, such as when the power is switched OFF or at 12 midnight, or specific situations, such as when broadcast transmissions are being received but no program is being viewed, and so forth.

In step S112, the same processes as those of steps S25 to S26 shown in FIG. 5 and described in the first embodiment are carried out. In other words, associated-web page information is acquired from the associated-web page information holding unit 109 and a search for an associated web page is performed using the associated-web page information and the program attribute information of the program that is the target of the search acquired in step S111. The acquired search-target program may be all the programs that are being held by the program attribute information holding unit 108 during this processing or programs of a certain time period only.

In step S113, as a result of the search conducted in step S112, it is determined whether or not a web page associated with the program exists. If it is determined that an associated web page does exist, processing then proceeds to step S114. If it is determined that an associated web page does not exist, processing then proceeds to step S115.

In step S114, the associated-web page information of the program that is the target of the search is held as the search results.

In step S115, it is determined whether or not the associated web page search for search-target program attribute information held in the program attribute information holding unit 108 is finished. If it is determined that the search process is finished, then the associated web page search process is ended. If it is determined that the search process is not finished, processing returns to step S111.

Figure 36:
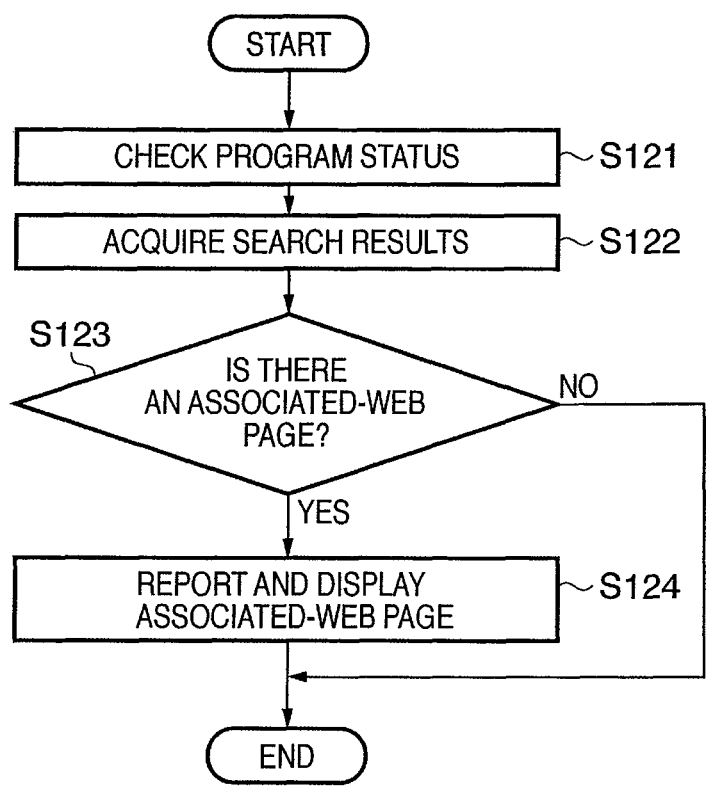
FIG. 36 is a flow chart illustrating steps in a process of notifying and displaying associated-web page information in the TV receiver of the seventh embodiment of the present invention.

Next, a description is given of steps in the associated-web page notification/display process implemented by the associated-web page notification/display unit 113 of the present embodiment, using the flow chart shown in FIG. 36.

Figure 34:
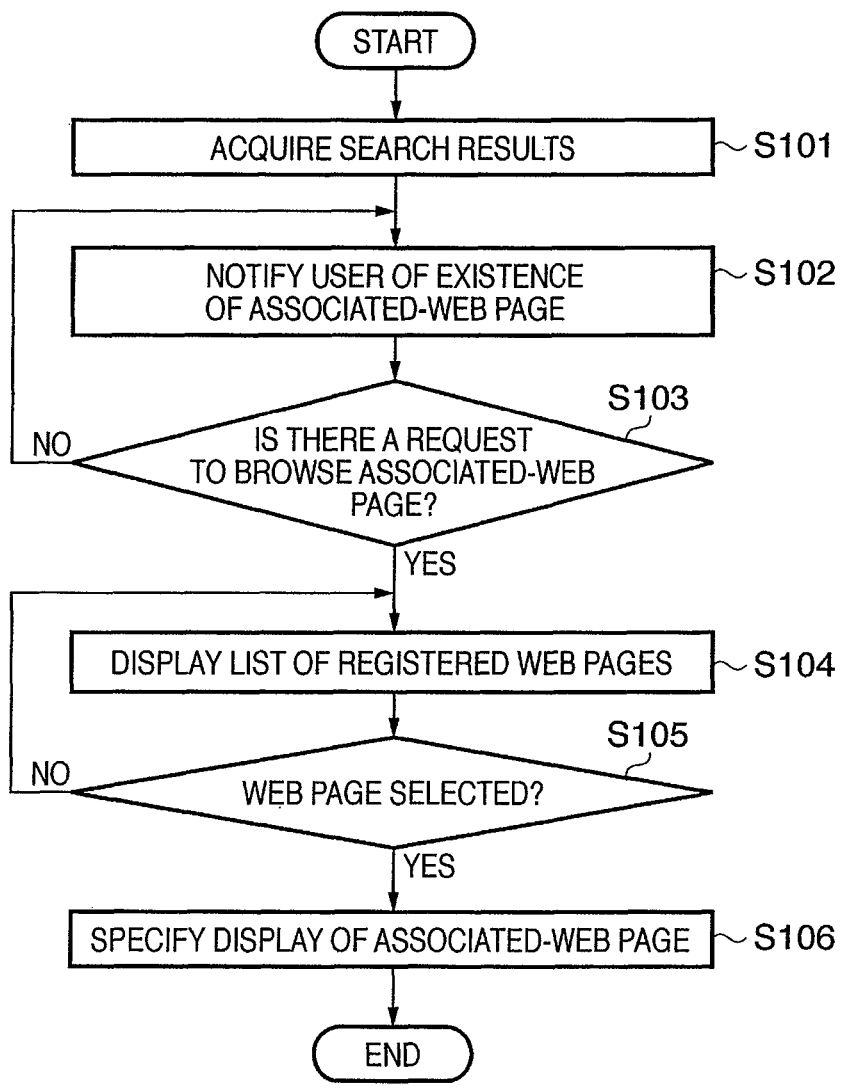
FIG. 34 is a flow chart illustrating steps in the process of notifying and displaying an associated web page in a TV receiver of a sixth embodiment of the present invention.

What is different in this process from the associated-web page notification/display process of other embodiments described using FIG. 6 and FIG. 34 is the addition of a process of determining whether or not an associated web page exists after acquiring the associated web page search results.

In step S121, a program status detecting unit 111 checks the status of the program being received. Specifically, the program status detecting unit 111 determines whether or not there is program that the viewer is viewing, and if so, transmits the program information to the associated web page search unit 112.

In step S122, the associated web page search unit 112 acquires a match between the program information held in step S114 described above and the program information acquired in step S121. Then, in step S123, the associated web page search unit 112 determines whether or not an associated web page exists. If the associated web page search unit 112 determines that an associated web page does exist, processing then proceeds to step S124. If the associated web page search unit 112 determines that an associated web page does not exist, the associated web page notification/display process is ended.

In step S124, the associated-web page notification/display unit 113 performs an associated web page notification/display process. This associated web page notification/display process is the same as that of steps S32 to S34 shown in FIG. 6 and steps S102 to S106 shown in FIG. 34, and therefore a description thereof is omitted.

Thus, as described above, by carrying out a search for an associated web page at predetermined times, the seventh embodiment can speed the determination as to whether or not an associated web page exists as well as speed the notification and display thereof.

Eighth Embodiment

In the first, sixth and seventh embodiments of the present invention, a description is given of performing associated web page notification prior to the user making an associated web page browse request. In an eighth embodiment of the present invention, a description is given of carrying out an associated web page notification after the user makes an associated web page browse request.

Figure 37:
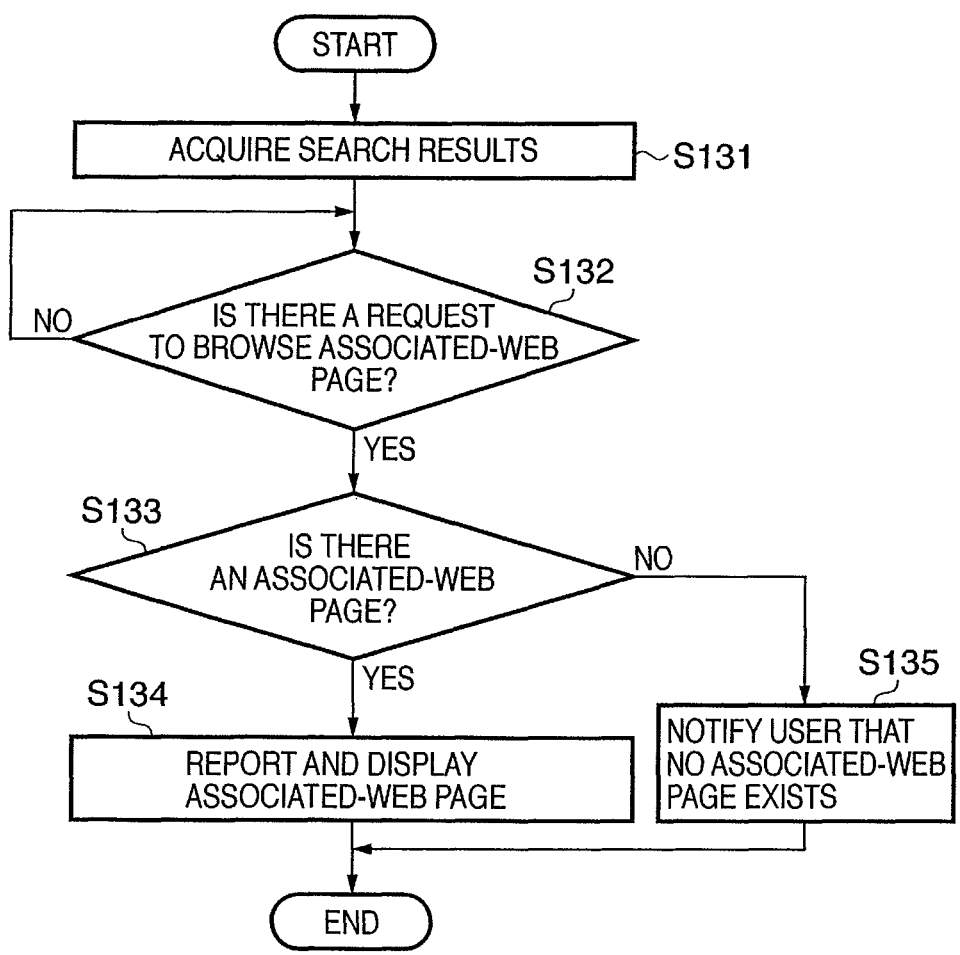
FIG. 37 is a flow chart illustrating steps in the process of notifying and displaying associated-web page information in a TV receiver of an eighth embodiment of the present invention.

A description is now given of steps in an associated web page notification/display process implemented by the associated-web page notification/display unit 113 of the TV receiver of the present embodiment, using the flow chart shown in FIG. 37.

In step S131, the associated-web page notification/display unit 113 acquires results of a search for an associated web page of a program being viewed from the associated web page search unit 112. It should be noted that associated-web page information is acquired if there is an associated web page, and associated web page information is not acquired if there is not.

In step S132, the associated-web page notification/display unit 113 determines whether or not there is an associated web page browse request from the user (the browse button 203 has been pressed). If the associated-web page notification/display unit 113 determines that there is a request, processing then proceeds to step S133. If the associated-web page notification/display unit 113 determines that there is no request, step S132 is repeated.

In step S133, the associated-web page notification/display unit 113 determines whether or not associated-web page information has been acquired in step S131. If the associated-web page notification/display unit 113 determines that associated-web page information has not been acquired, processing then proceeds to step S135.

In step S134, the associated-web page notification/display unit 113 carries out the same associated web page notification/display process as that of steps S32 to S34 shown in FIG. 6 and steps S102 to S106 shown in FIG. 34.

In step S135, the associated-web page notification/display unit 113 displays notification of the fact that there is no associated web page for the program on the monitor.

Thus, as described above, the eighth embodiment makes it possible to notify the user of the existence of an associated web page without interrupting viewing of the program by notifying the existence of an associated web page after the user has made an associated web page browse request.

Ninth Embodiment

In the first embodiment and the sixth through eighth embodiments, a description was given of notifying the user of an associated web page during program viewing. In a ninth embodiment of the present invention, a description is given of notifying the user of an associated web page during display of an EPG (electronic program guide) or a program description.

Figure 38:
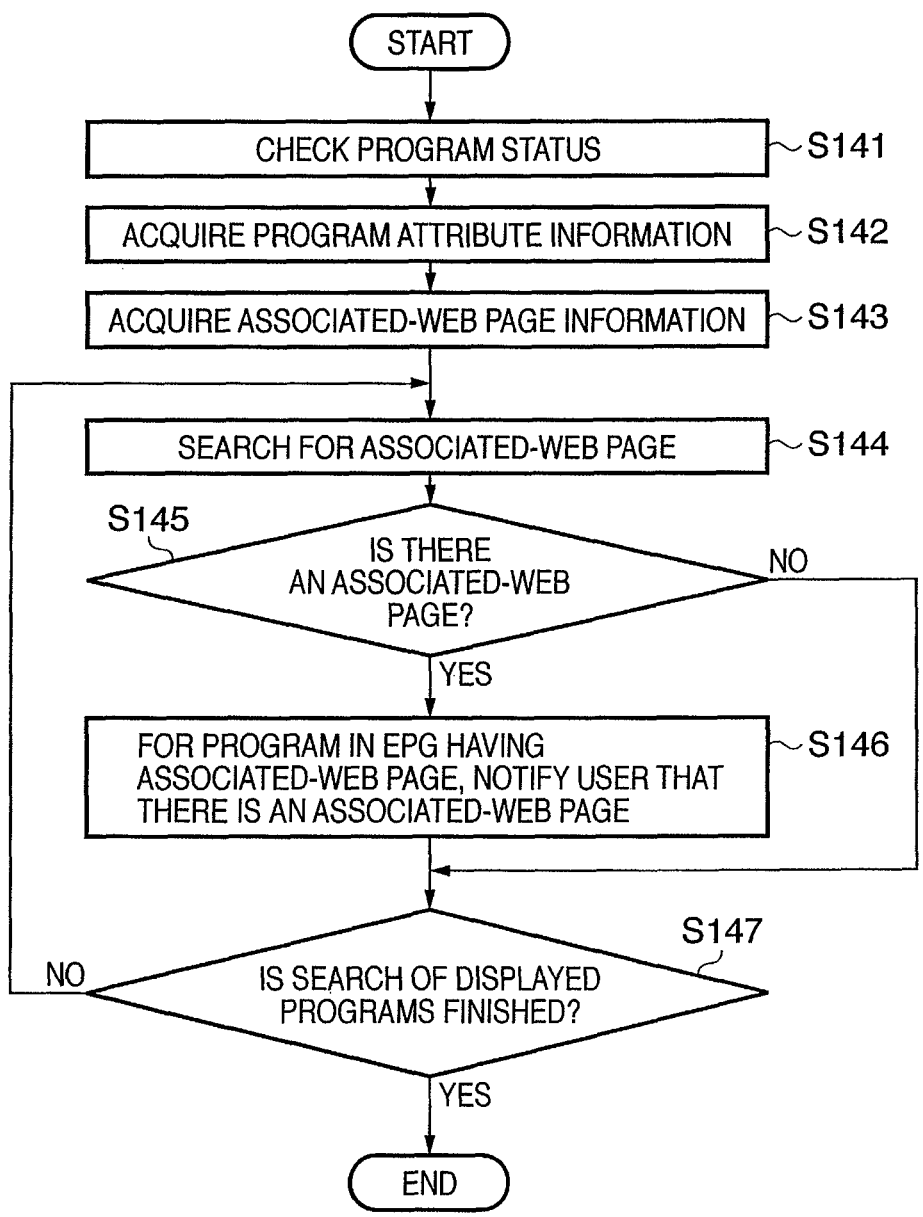
FIG. 38 is a flow chart illustrating steps in a process of searching for and notifying program associated-web page information in the TV receiver of the eighth embodiment of the present invention.

A description is now given of steps in the process of searching for and notifying the user of an associated web page for a program carried out by the associated web page search unit 112 and the associated-web page notification/display unit 113 of the TV receiver of the present embodiment, using the flow chart shown in FIG. 38.

In this case, it is assumed that an EPG is displayed on the monitor 310. In step S141, the associated web page search unit 112 specifies a program included in the EPG range displayed on the monitor 310 from a function unit, not shown, that generates EPG display data.

In step S142, the associated web page search unit 112 acquires the program attribute information of the program specified in step S141 from the program attribute information holding unit 108.

In step S143, the associated web page search unit 112 acquires the associated-web page information held in the associated-web page information holding unit 109.

In step S144, the associated web page search unit 112 searches for an associated web page, using the same process as that of step S26 shown in FIG. 5.

In step S145, from the search results of step S144 the associated web page search unit 112 determines whether or not an associated web page exists for the search-target program. If it is determined that an associated web page does exist, processing then proceeds to step S146. If it is determined that an associated web page does not exist, processing then proceeds to step S147.

In step S146, the associated-web page notification/display unit 113, in conjunction with another functional unit, for example, a functional unit that generates EPG data, displays in the EPG a notice indicating that an associated web page exists. Notification that an associated web page exists for the program displayed in the EPG can be implemented by, for example, an icon like icon 309 shown in FIG. 40, or by display methods like those shown in FIGS. 15A-D.

In step S147, it is determined whether or not the search for an associated web page for the program displayed in the EPG is finished. If it is determined that the search is finished, then the associated-web page notification/display process is ended. If it is determined that the search is not finished, processing returns to step S144.

Figure 39:
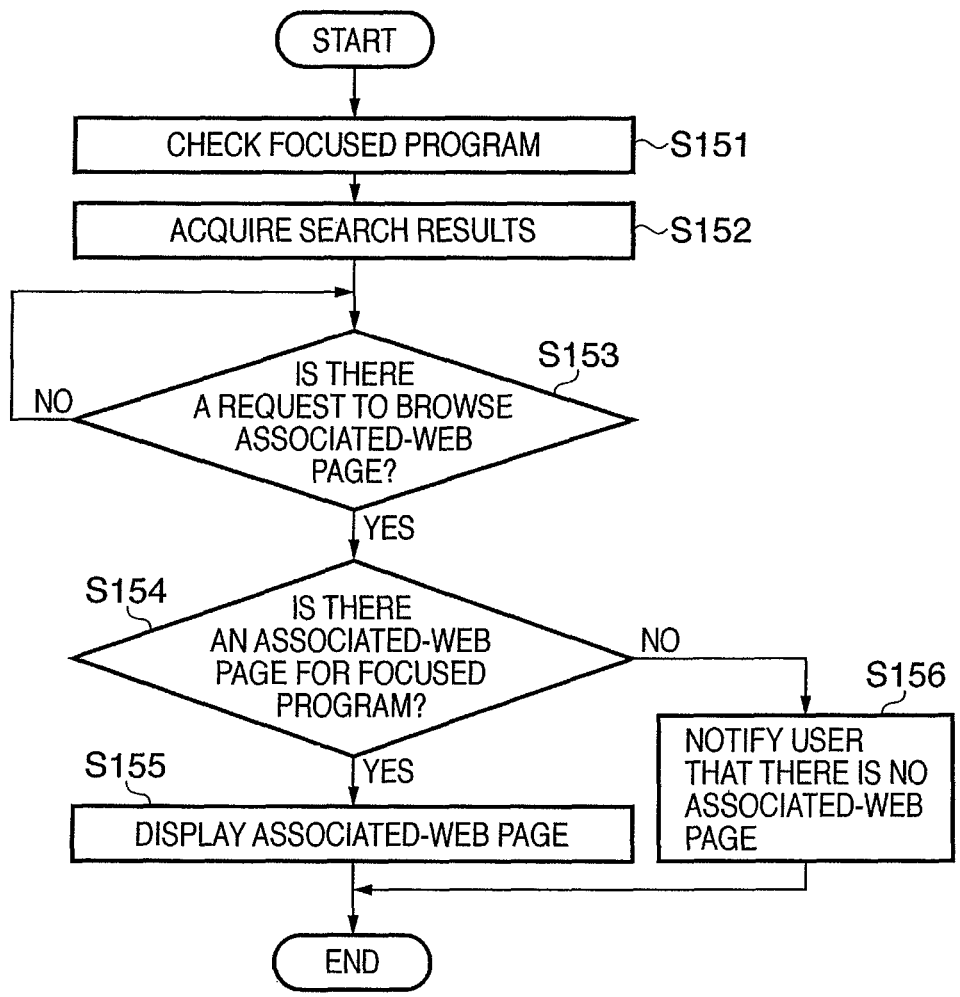
FIG. 39 is a flow chart illustrating a process of displaying an associated web page in a TV receiver of a ninth embodiment of the present invention.

Next, a description is given of steps in a process performed when displaying an associated web page for a program being displayed in the EPG by the associated-web page notification/display unit 113 of the TV receiver of the present embodiment, using the flow chart shown in FIG. 39.

The associated web page display process starts from a state in which the user is being notified of the existence of an associated web page for a program that is being displayed on an EPG screen like that shown in FIG. 40.

By pressing the browse button 203, in step S151 the user specifies which program in the EPG screen is to be focused on.

In step S152, the associated-web page notification/display unit 113 acquires the associated-web page information of the focused-on program. Associated-web page information is obtained if there is associated-web page information, and associated-web page information is not obtained if there is not.

In step S153, the associated-web page notification/display unit 113 determines whether or not there is an associated web page browse request from the user. If it is determined that there is such a request, processing then proceeds to step S154. If it is determined that there is no such request, the process of step S153 is continued.

In step S154, it is determined whether or not there is an associated web page for the program focused on in the EPS. In other words, it is determined whether or not associated-web page information has been acquired in step S152. If there is an associated web page, then in step S155 an associated web page display is carried out. By contrast, if there is no associated web page, then in step S156 the user is notified that there is no associated web page and processing is ended.

It should be noted that the associated-web page notification/display process for a program displayed in the program description also is possible with any of the methods shown in FIG. 6, FIG. 24 and FIG. 37.

Figure 41:
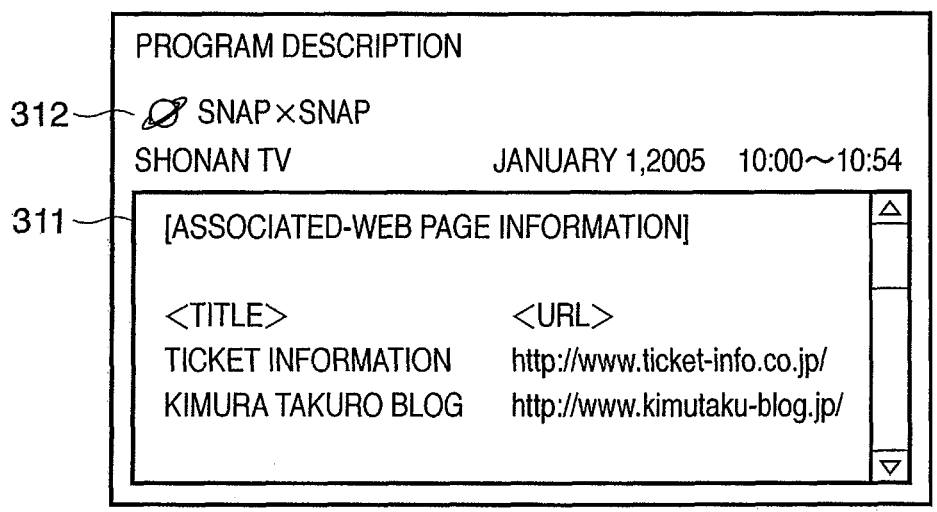
FIG. 41 is a diagram showing an example of a state in which the existence of associated web pages is notified using a program description screen in the TV receiver of the ninth embodiment of the present invention.

The associated-web page notification/display process for a program displayed in the program description starts from a state in which a program description is displayed on the monitor 310 in a state in which notification is given of the existence of an associated web page like that shown in FIG. 41. In the example shown in FIG. 41, the user is notified of the existence of an associated web page by displaying an icon 312, displaying associated-web page information in an information display area 311, or the like.

When the browse button 203 is pressed starting from this state, the process of displaying the associated web page may be carried out.

Thus, as described above, by displaying information indicating the presence of an associated web page on the EPG screen or the program description screen, the ninth embodiment enables the user to be notified of the existence of an associated web page for a program that is not currently being viewed and regardless of the broadcast date and time. Further, the ninth embodiment enables the user to display the associated web page with a simple operation.

Tenth Embodiment

In the first embodiment and the sixth through ninth embodiments, a description was given of notification and display of an associated web page for a program received in real time from a broadcasting station. In a tenth embodiment of the present invention, a description is given of notification and display of an associated web page for a program recorded by an external recording apparatus.

Figure 42:
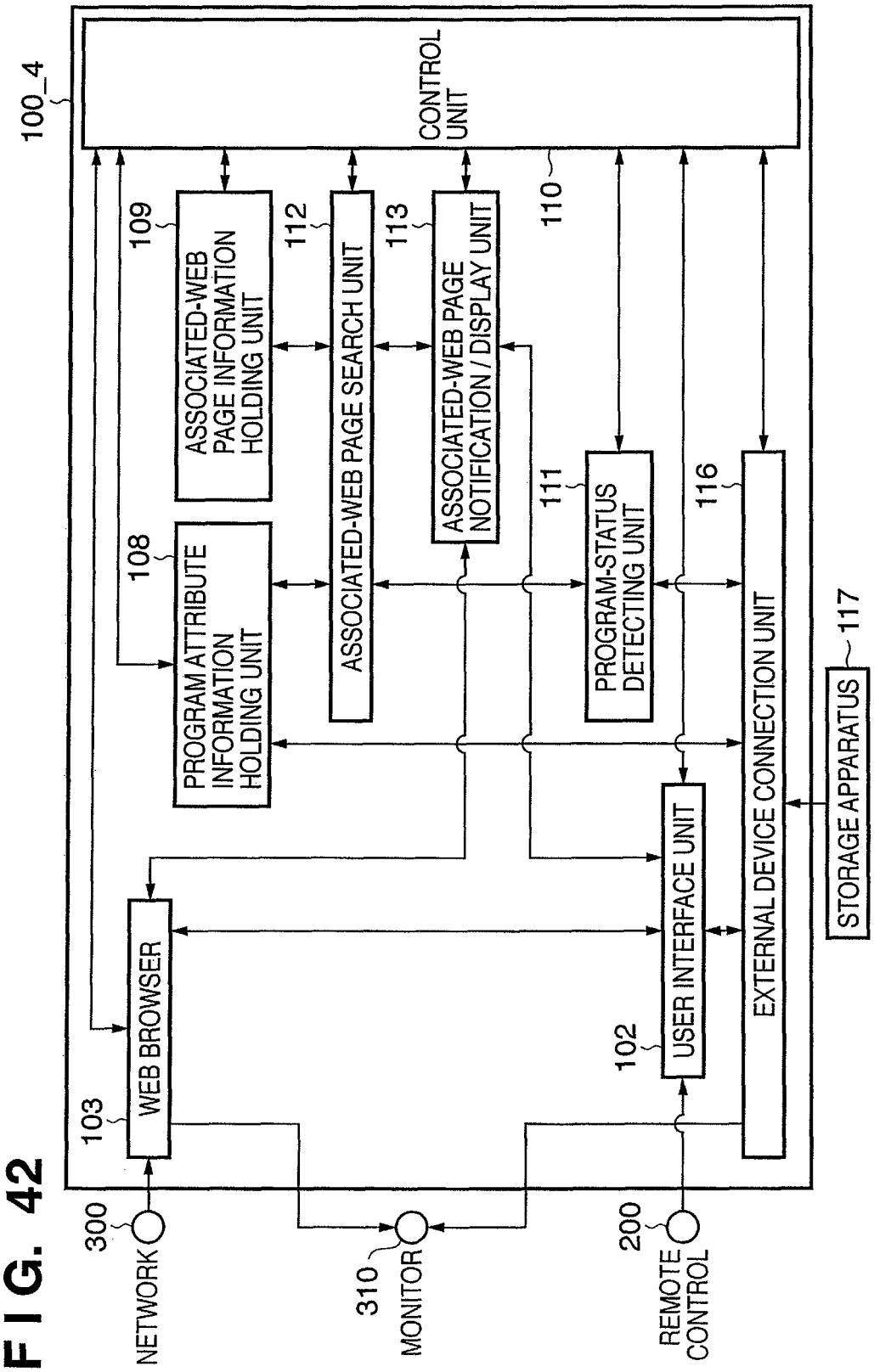
FIG. 42 is a block diagram showing a configuration pertaining to a web page display process in a TV receiver as one example of a web information processing apparatus according to a tenth embodiment of the present invention.

FIG. 42 is a block diagram showing a configuration pertaining to a web page display process in a TV receiver according to the tenth embodiment. In other words, FIG. 42 is a block diagram showing a configuration of a web information display apparatus according to the present embodiment.

It should be noted that blocks shown in FIG. 42 having the same reference numerals as those shown in FIG. 2 have the same functions, and therefore a description thereof is omitted.

An external device connection unit 116 displays playback video of and program description for a program recorded by a storage apparatus 117, acquires attribute information of the recorded program, and so forth. The storage apparatus 117 is an apparatus that stores signals in which TS received from a broadcast transmission is converted into a partial transport stream (hereinafter "P-TS"). In addition to the recorded program video and audio, program attribute information required for associated web page search is also contained in the P-TS. As a result, associated web page registration as well as search and display can be carried out for a program recorded in the storage apparatus 117 using the methods described above.

In the tenth embodiment, the search for an associated web page is carried out based on the program attribute information contained in the program data stored in the external recording apparatus, which enables the user to know of the existence of an associated web page even for that program which is recorded in the external recording apparatus, and further, enables the user to display that web page with a simple operation. It should be noted that the associated web page search process as well as the web page notification and display process carried out based on the program attribute information contained in the program data stored in the external recording apparatus, are the same processes as those described in the embodiments described above. For example, when playing back program data stored in the external recording apparatus, the associated web page search unit 112 acquires the program attribute information contained in the stored program data and conducts a search using information held by the associated web page holding unit 109.

Eleventh Embodiment

In the first through fifth embodiments, a description was given of a method of registering a web page and linked information corresponding to that web page. By contrast, in an eleventh embodiment of the present invention, a description is given of a process of directly linking and registering a program and web information when registering a web page.

Figure 44:
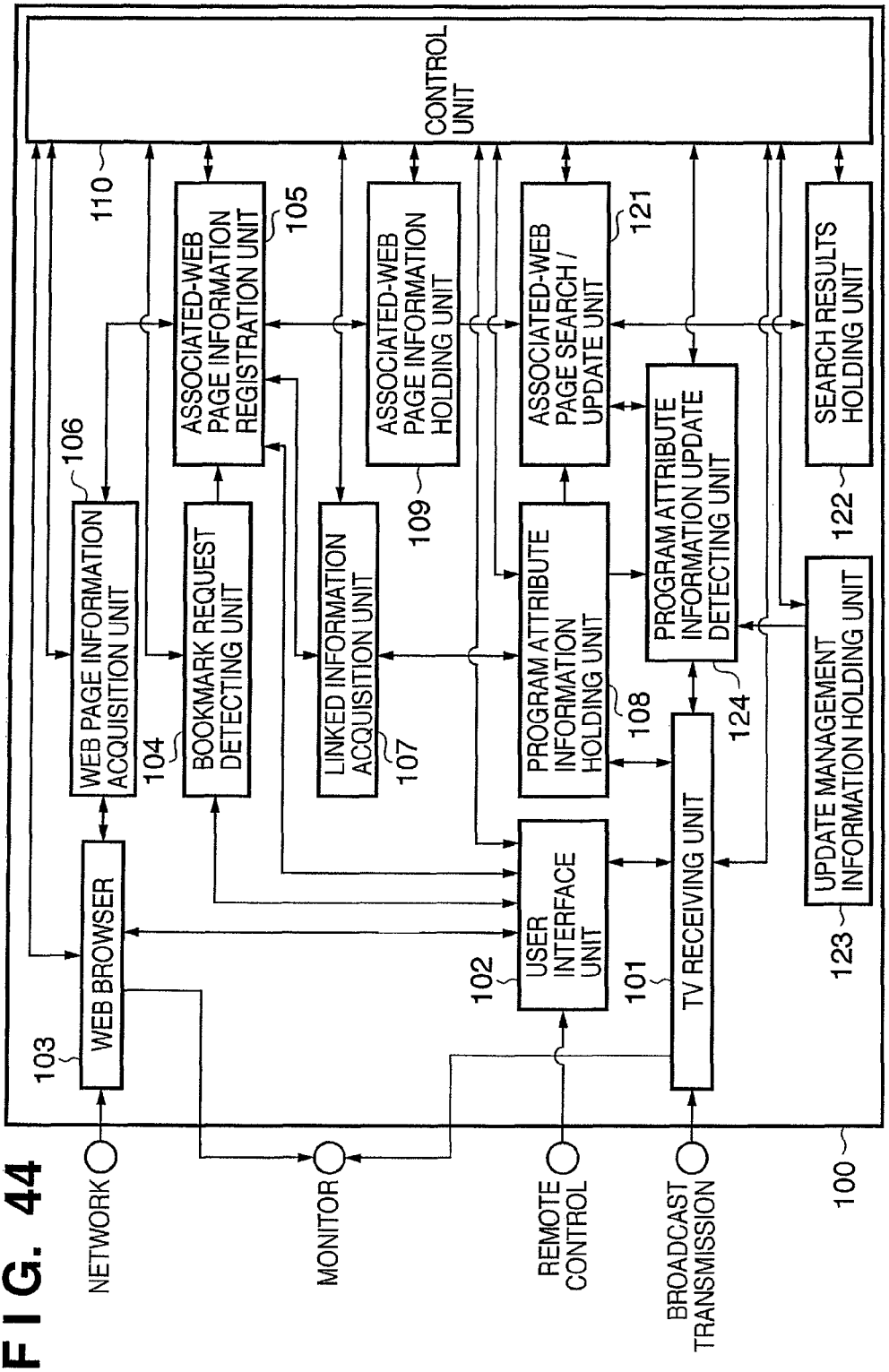
FIG. 44 is a block diagram showing a configuration of a web information registration apparatus as one example of a web information processing apparatus according to an eleventh embodiment of the present invention.

FIG. 44 is a block diagram showing a configuration pertaining to a web page registration process in the TV receiver according to the eleventh embodiment. In other words, FIG. 44 is a block diagram showing a configuration of a web information processing apparatus according to the present embodiment.

It should be noted that blocks having the same reference numerals as those shown in FIG. 1 have the same functions, and therefore a description thereof is omitted.

Based on associated-web page information added to the associated-web page information holding unit 109 and on program attribute information held by the program attribute information holding unit 108, an associated web page search/update unit 121 searches programs for which program information has already been obtained to determine whether or not there are programs to be associated with a web page. Moreover, the associated web page search/update unit 121 acquires program attribute information from the program attribute information holding unit 108 for a program for which a program attribute information update detecting unit 124 described below detects an update of program attribute information and carries out a process of updating the associated web page. Based on the results of the foregoing associated web page search/update process, the associated web page search/update unit 121 creates a table linking each program with an associated web page or pages like that shown in FIG. 46, which table is then stored in a search results holding unit 122 described below. A detailed description is given later, with reference to FIG. 45 and to FIG. 47 through FIG. 49.

The search results holding unit 122 acquires and holds associated web page search/update results from the associated web page search/update unit 121.

A update management information holding unit 123 holds a table like that shown in FIG. 50 that defines program attribute information acquisition ranges and acquisition order used to detect updates in program attribute information by a program attribute information update detecting unit 124 described below. In the example shown in FIG. 50, the channel, broadcast date and broadcast time slot defined the program attribute information acquisition range, with the acquisition order defined in chronological order starting from the time nearest the present.

The program attribute information update detecting unit 124 detects a program for which program attribute information has been updated based on the information held by the update management information holding unit 123 and the program attribute information held in the program attribute information holding unit 108. When a program attribute information update is detected, the program attribute information of such program is sent to the associated web page search/update unit 121. The associated web page search/update unit 121 searches for and updates the associated web page, a detailed description of which is given using FIG. 47 through FIG. 49.

Figure 45:
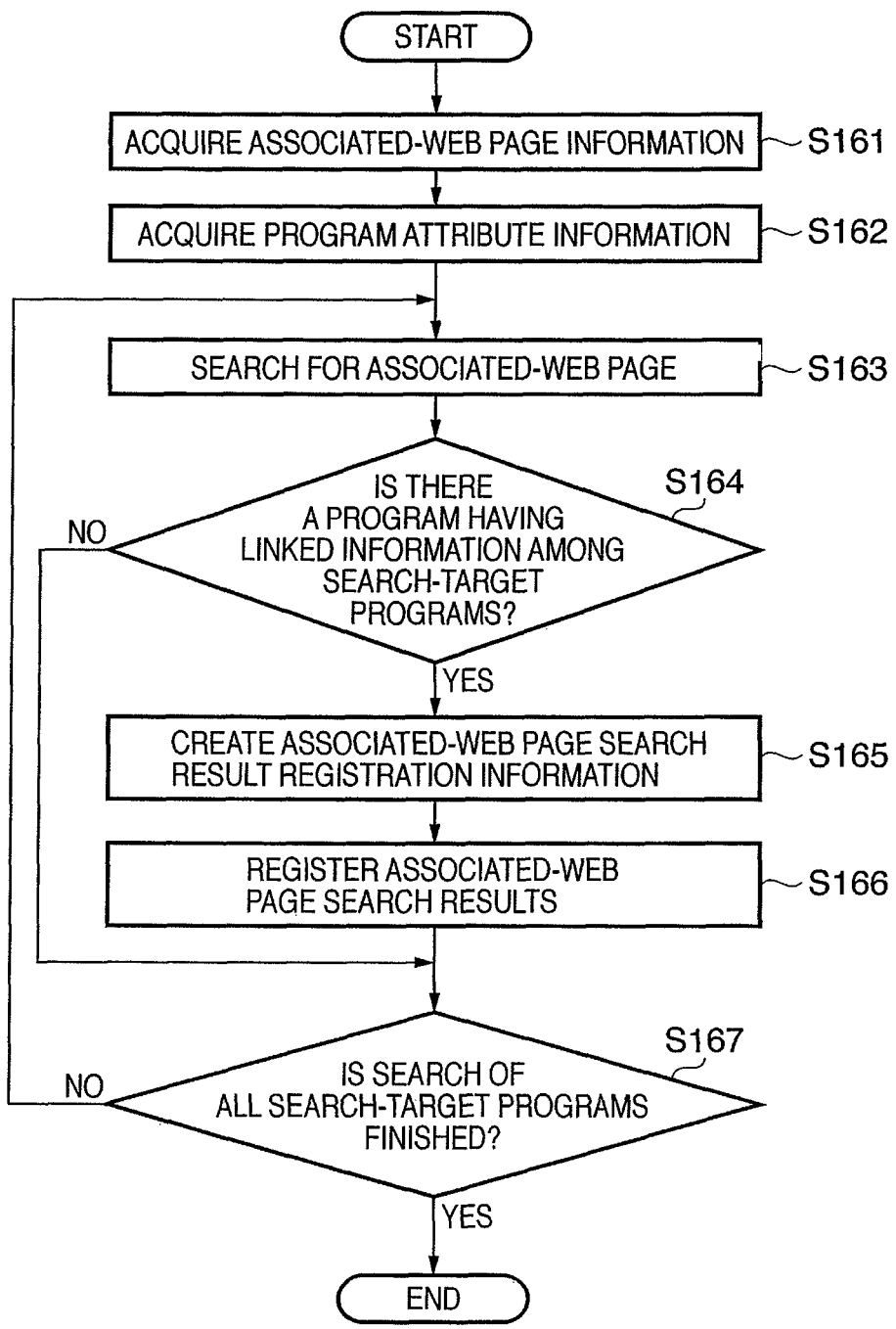
FIG. 45 is a flow chart illustrating steps in the process of searching for an associated web page in the TV receiver of the eleventh embodiment of the present invention.

A description is now given of steps in an associated web page search process implemented by the associated web page search/update unit 121 of this embodiment, using the flow chart shown in FIG. 45.

In step S161, the associated web page search/update unit 121 acquires the associated web page information newly added to the associated-web page information holding unit 109. Then, in step S162, the associated web page search/update unit 121 acquires the program attribute information held in the program attribute information holding unit 108. Processing then proceeds to step S163.

Next, in step S163, the associated web page search/update unit 121 searches for linked information according to the associated-web page information acquired in step S161 from the program attribute information acquired in step S162. It should be noted that this linked information is the same as the linked information described above in the above-described embodiments.

Next, in step S164, the associated web page search/update unit 121 determines whether or not linked information in the associated-web page information acquired in step S161 is contained in the program attribute information acquired in step S162, based on the search results of step 163. If it is determined that such linked information is contained in the program attribute information, processing then proceeds to step S165. If it is determined that such linked information is not contained in the program attribute information, processing then proceeds to step S167.

In step S165, the associated web page search/update unit 121 generates information linking program and associated web page like that shown in FIG. 46, based on the correspondence between program and associated-web page information stored in step S161.

In step S166, the associated web page search/update unit 121 registers the information linking program and associated web page generated in step S165 in the search results holding unit 122.

Next, in step S167, the associated web page search/update unit 121 determines whether or not the search for an associated web page for the search-target program attribute information held in the program attribute information holding unit 108 is finished. If it is determined that the search is finished, then this process is finished. If it is determined that the search is not finished, then processing returns to step S163 and a search of the unfinished portion is continued.

Figure 47:
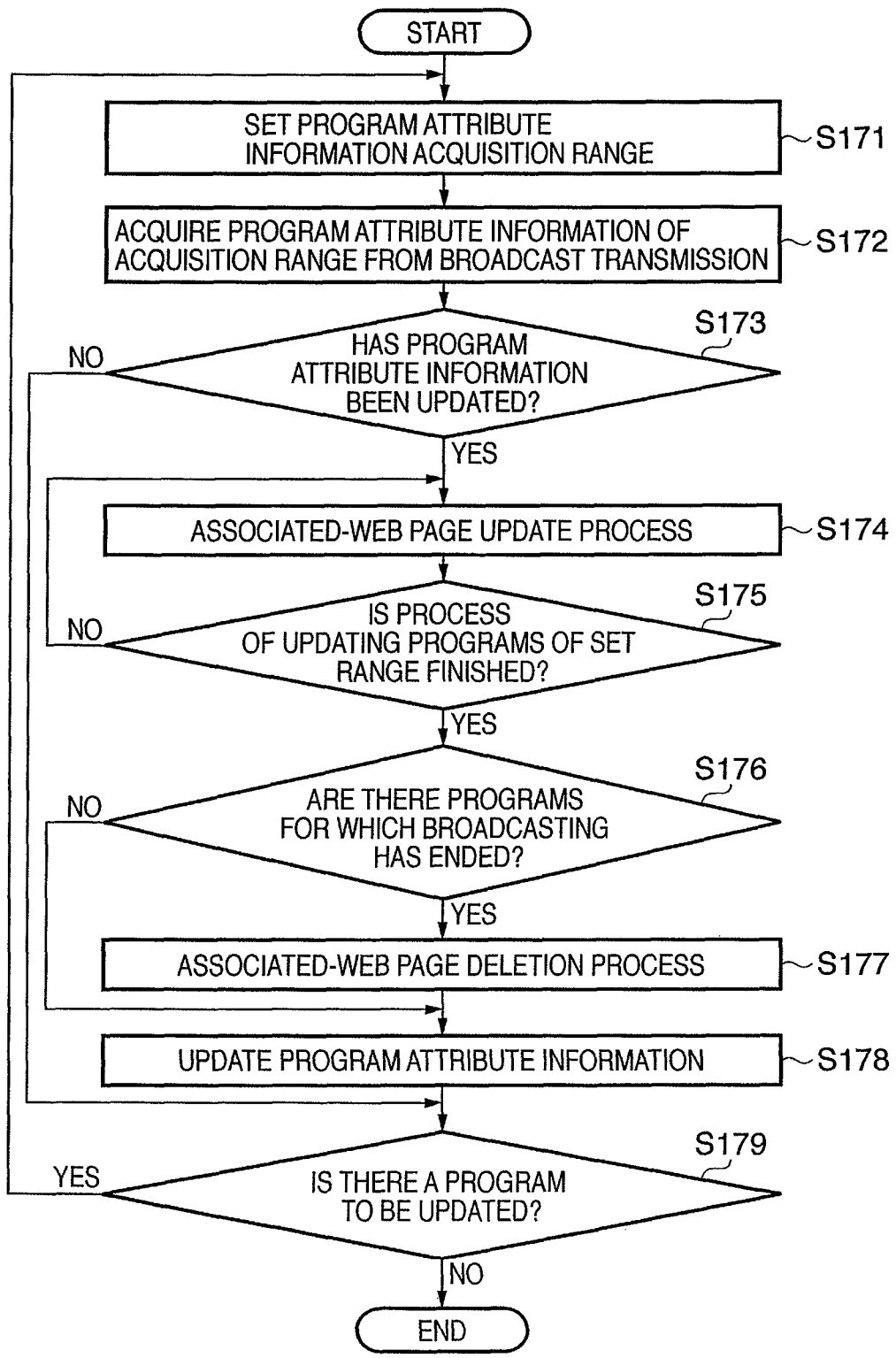
FIG. 47 is a flow chart illustrating steps in a process of updating associated web page search results in the TV receiver of the eleventh embodiment of the present invention.
Figure 49:
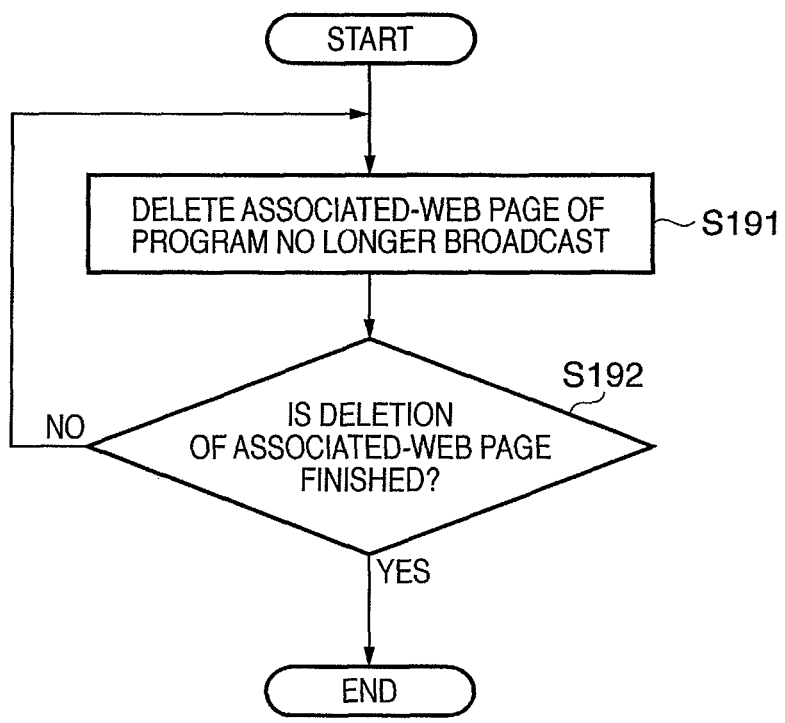
FIG. 49 is a flow chart illustrating steps in the process of updating associated web page search results in the TV receiver of the eleventh embodiment of the present invention.

A description is now given of steps in the associated web page search results update process implemented by the program attribute information update detecting unit 124 of the present embodiment and the associated web page search/update unit 121, using the flow charts shown in FIG. 47, FIG. 48 and FIG. 49.

In step S171, the program attribute information update detecting unit 124 sets the range of program attribute information to be acquired from the broadcast transmission. In the present embodiment, the range of program attribute information to be acquired is set by the channel, date and time slot. For example, channel 102, five days ahead at 12:00:00 to 14:59:59 is set as a program attribute information acquisition range. The program attribute information acquisition ranges are set using a table that defines the program attribute information acquisition ranges like those shown in FIG. 50.

In step S172, the program attribute information update detecting unit 124 acquires program attribute information of the acquisition range set in step S171 from the broadcast transmission. Then, in step S173, the program attribute information update detecting unit 124 determines whether or not the program attribute information in the acquisition range set in step S171 and held in the program attribute information holding unit 108 has been updated.

As shown for example in FIG. 50, the program attribute information update detecting unit 124 determines whether or not program attribute information held in the program attribute information holding unit 109 for a program on channel 102 whose date of broadcast is five days from today and whose broadcast time slot is 12:00:00 to 14:59-59 has been updated. The method used to determine whether or not there is an update in the present embodiment involves comparing the program attribute information acquired from the broadcast transmission within the acquisition range set in step S171 and the program attribute information already held in the program attribute information holding unit 108, and determining whether or not there is any difference between the two sets of information. The method of comparison used here is, for example, one that compares data of two memory areas like the memcmp function of C programming language. However, any method capable of comparing two pieces of information may be used. If in step S173 it is determined that the program attribute information has been updated processing then proceeds to step S174. If it is determined that the program attribute information has not been updated, processing then proceeds to step S179. In step S174, the program attribute information update detecting unit 124 and the associated web page search/update unit 121 update the associated web page for the program for which program attribute information from the broadcast transmission within the acquisition range has been acquired. A description of the details of the associated web page updating process is given using FIG. 48.

In step S175, the program attribute information update detecting unit 124 determines whether or not the associated web page updating process for programs in the acquisition range set in step S171 is finished. If it is determined that the updating process is finished, processing then proceeds to step S176. If it is determined that the updating process is not finished, processing returns to step S174.

In step S176, the program attribute information update detecting unit 124 determines whether or not there are programs in the acquisition range set in step S171 that are no longer being broadcast. The determination as to whether or not a program is no longer broadcast is made by determining whether or not there is a program in the acquisition range set in step S171 for which program attribute information exists in the program attribute information holding unit 108 but for which program attribute information is not acquired from the broadcast transmission. If it is determined that a program exists that is no longer broadcast, processing then proceeds to step S177. If it is determined that such a program does not exist, processing then proceeds to step S178.

In step S177, the associated web page search/update unit 121 deletes the associated web page pertaining to a program that is no longer broadcast that is detected by the program attribute information update detecting unit 124. A detailed description of the associated web page deletion process of step S177 is given using FIG. 49.

In step S178, the TV receiving unit 101 updates the program attribute information held in the program attribute information holding unit 108, based on the program attribute information acquired from the broadcast transmission set in step S172.

Next, in step S179, using the table shown in FIG. 50 the program attribute information update detecting unit 124 checks for a next range to acquire program attribute information and determines whether or not a program targeted for updating exists. Processing returns to step S171 if it is determined that there is a program targeted for updating. If it is determined that there is no program targeted for updating, the associated web page update process is ended.

Next, a detailed description is given of the associated web page search results update process implemented in step S174 shown in FIG. 47, using the flow chart shown in FIG. 48.

First, in step S181, the program attribute information update detecting unit 124 determines whether or not a program whose program attribute information has been acquired from the broadcast transmission exists in the program attribute information holding unit 108. That is, it is determined if the program is one for which program attribute information has been acquired previously. If not-yet-acquired, that is, if it is determined that the program is newly acquired, processing then proceeds to step S183. If it is determined that the program is one for which program attribute information has already been acquired, processing then proceeds to step S182. In step S182, the program attribute information update detecting unit 124 determines whether or not the contents of the program attribute information acquired from the broadcast transmission and the program attribute information held in the program attribute information holding unit 108 match. The determination as to whether or not the contents of the program attribute information match is made by comparing the two sets of program attribute information as in step S173 shown in FIG. 47. If it is determined that the two sets of program attribute information match, the associated web page update process is ended. If it is determined that the two sets of program attribute information do not match, processing proceeds to step S183.

In step S183, the associated web page search/update unit 121 carries out the same associated web page search for the search-target program as that of steps S25 to S26 shown in FIG. 5 and described in the first embodiment.

In step S184, the associated web page search/update unit 121 updates the associated-web page information of the search-target program held in the search results holding unit 122, based on the search results of the associated web page search carried out in step S183.

Next, a description is given of an associated web page search results deletion process implemented in step S177 shown in FIG. 47, using the flow chart shown in FIG. 49.

In step S191, the associated web page search/update unit 121 deletes the associated web page held in the search results holding unit 122 of a program no longer being broadcast. Identification of a program that is no longer broadcast, as shown in step S171 shown in FIG. 47, is accomplished by identifying a program for which program attribute information is held in the program attribute information holding unit 108 and for which program attribute information is not acquired from the broadcast transmission.

Next, in step S192, the associated web page search/update unit 121 determines whether or not the process of deleting an associated web page of a program that is no longer broadcast is finished. If it is determined that the deletion process is finished, the associated web page deletion process is ended. If it is determined that the deletion process is not finished, processing returns to step S191.

The foregoing describes the eleventh embodiment. In the eleventh embodiment, at associated web page registration the associated web page and the program are associated in advance and stored. Searching for a corresponding program during web page registration and holding the program in an associated state eliminates the need to search using program attribute information and linked information during web page display, enabling display to be carried out promptly. Moreover, whenever the program attribute information is updated, the association between the associated web page and the program is updated. Such a construction enables determination as well as notification and display of the existence of a web page associated with a program to be carried out accurately even when there is a change of broadcast program content.

Twelfth Embodiment

Next, a description is given of a twelfth embodiment of the present invention. The twelfth embodiment assumes the associated web page registration and updating described in the eleventh embodiment, and a description is given of associated web page notification and display based on that registration and updating.

Figure 51:
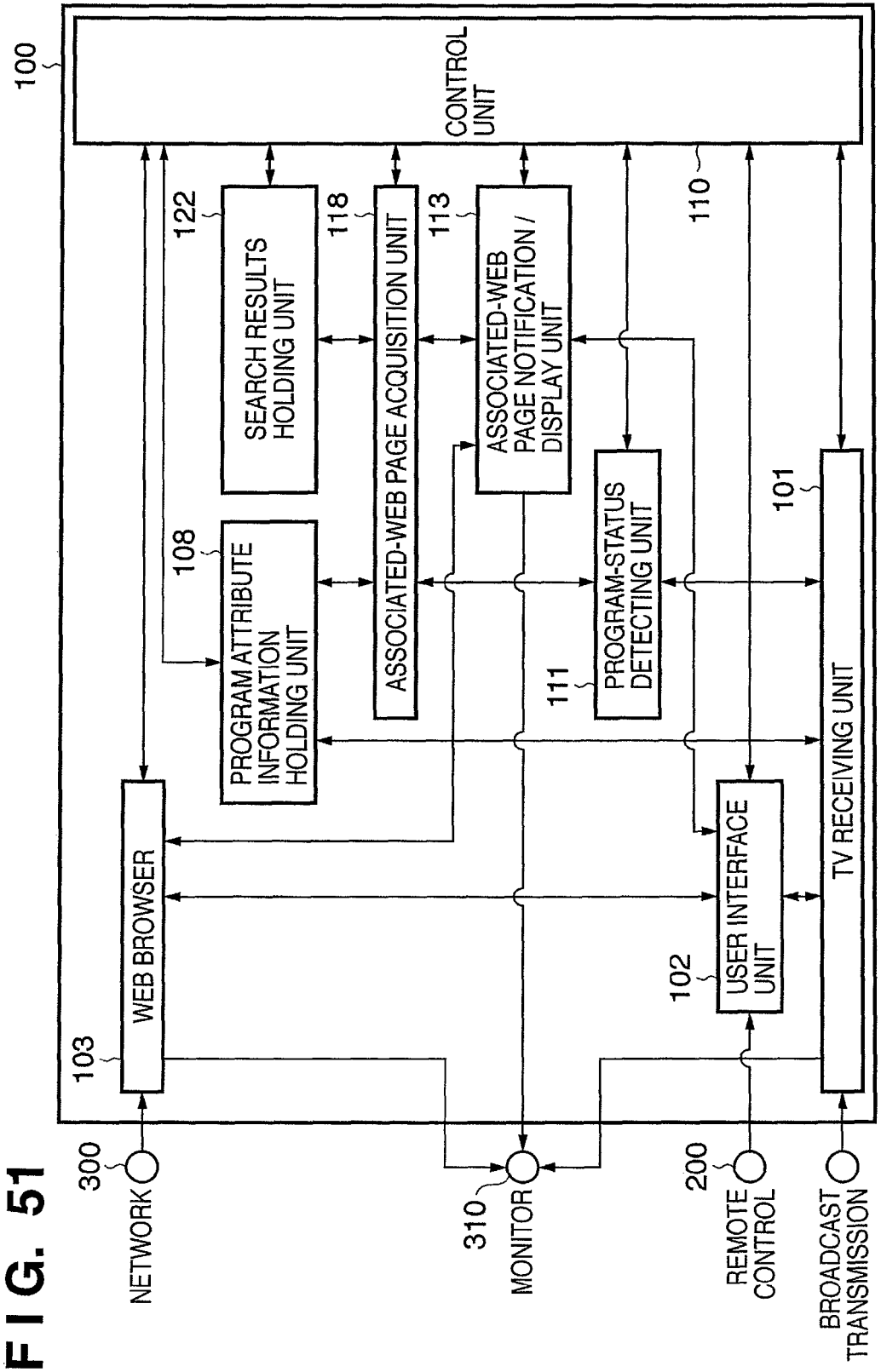
FIG. 51 is a block diagram showing a configuration of a web information display unit as one example of a web information processing apparatus according to a twelfth embodiment of the present invention.

FIG. 51 is a block diagram showing a configuration of a web information processing apparatus or a TV receiver according to the twelfth embodiment. It should be noted that blocks having the same reference numerals as those shown in FIG. 2 or FIG. 44 have the same functions as shown in FIG. 2 and FIG. 44, and a description thereof is omitted.

The associated web page acquisition unit 118 acquires a web page associated with a program based on information that specifies a program notified from the program status detecting unit 111.

A description is now given of steps in an associated web page notification/display process for a program being viewed as implemented by the associated web page acquisition unit 118 and the associated-web page notification/display unit 113 of the TV receiver of the present embodiment, using the flow chart shown in FIG. 52.

First, in step S201, the associated web page acquisition unit 118 carries out the same process as that of step S23 shown in FIG. 5. Next, in step S202, the associated web page acquisition unit 118 acquires information specifying the program being received from the program status detecting unit 111, after which processing proceeds to step S203.

In step S203, the associated web page acquisition unit 118 determines whether or not there are associated web page search results for the program notified from the program status detecting unit 111 in the search results holding unit 122. If it is determined that there are search results, processing then proceeds to step S204. If it is determined that there are no search results, the associated web page notification/display process is ended.

In step S204, the associated web page acquisition unit 118 acquires the associated web page search results for the program being received from the search results holding unit 122. Then, in step S205, the associated-web page notification/display unit 113 acquires the associated web page of the program being received from the associated web page acquisition unit 118. Processing thereafter is the same as that shown in steps S32 to S34 shown in FIG. 6.

Figure 53:
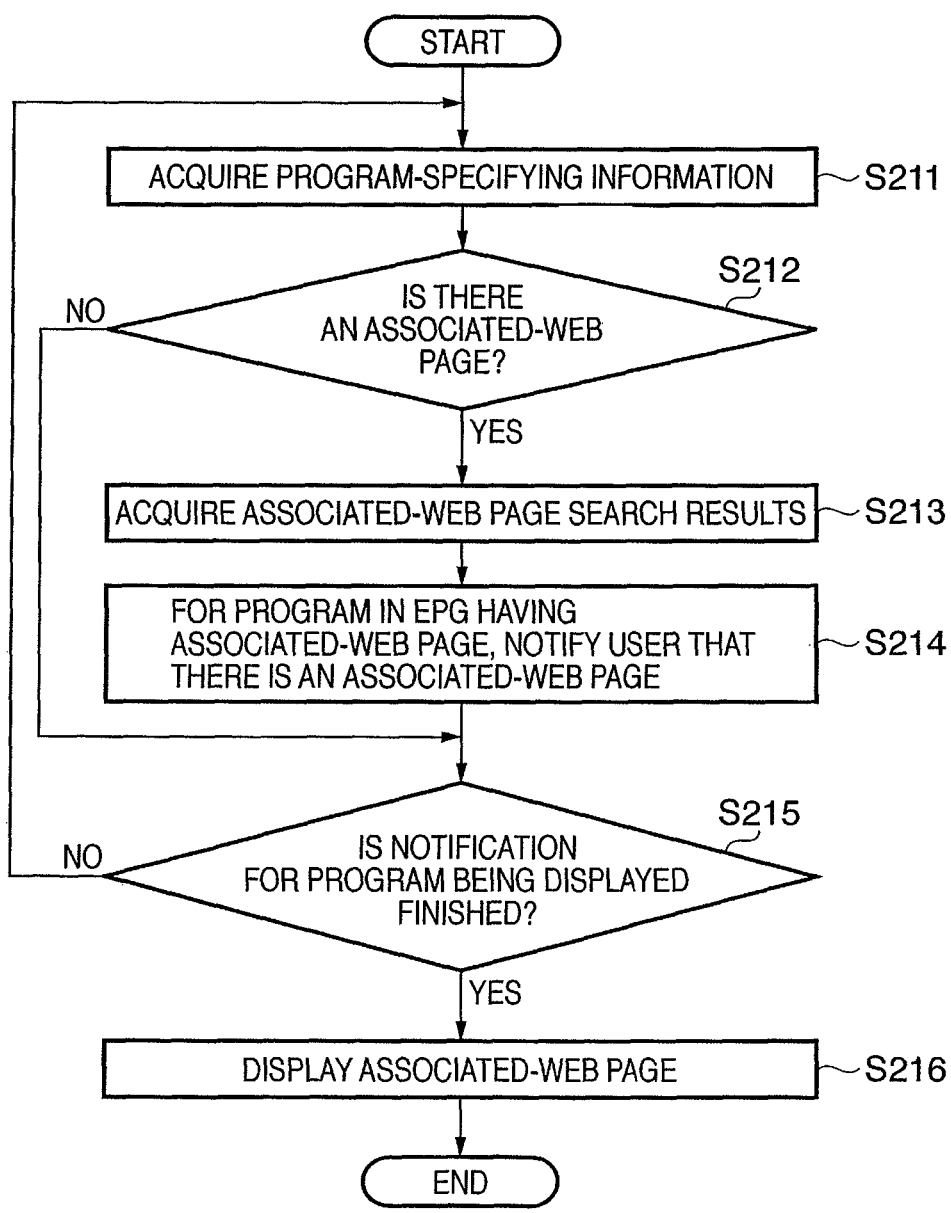
FIG. 53 is a flow chart illustrating steps in the process of notifying and displaying an associated web page in the TV receiver of the twelfth embodiment of the present invention.

Next, a description is given of an associated web page notification and display process for a program being displayed in an EPG as executed by the associated web page acquisition unit 118 and the associated-web page notification/display unit 113 of the TV receiver of the present embodiment, using the flow chart shown in FIG. 53.

First, in step S211, the associated web page acquisition unit 118 acquires information specifying a program being displayed in the EPG from the program attribute information holding unit 108.

Next, in step S212, the associated web page acquisition unit 118, based on the associated web page search results held in the search results holding unit 122, determines whether or not an associated web page exists for the program being displayed in the EPG. If it is determined that an associated web page does exist, processing then proceeds to step S213. If it is determined that an associated web page does not exist, processing then proceeds to step S215.

In step S213, the associated web page acquisition unit 118 acquires associated web page search results from the search results holding unit 122. Then, in step S214, the associated-web page notification/display unit 113 carries out the same process as that of step S146 shown in FIG. 38.

In step S215, the associated web page acquisition unit 118 determines whether or not associated web page notification for the program being displayed in the EPG is finished. If it is determined that notification is finished, processing then proceeds to step S216. If it is determined that notification is not finished, processing returns to step S211.

In step S216, the associated-web page notification/display unit 113 performs the same process as the associated web page display process shown in FIG. 39.

The foregoing describes the twelfth embodiment, which, since it notifies the user of an associated web page using the configuration described in the eleventh embodiment, enables notifying of information to the user to be carried out promptly. Particularly when employed in notifying the user of web pages associated with programs in a display format in which multiple programs are displayed simultaneously as in an EPG, associating the programs and the web pages in advance enables processing to be carried out promptly.

The embodiments described above can also be implemented as software by a programmable web information processing apparatus or system including a computer (or CPU, MPU or the like).

Therefore, a program supplied to a computer in order to implement the embodiment described above by such computer itself also implements the present invention. That is, a computer program for implementing the function of the embodiment described above is itself within the scope of the present invention.

It should be noted that a computer program for implementing the embodiments described above may be in any form provided that it is machine-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

Besides cases where the aforementioned functions according to the embodiments are implemented by executing the read program by computer, an operating system or the like running on the computer may perform all or a part of the actual processing, so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-140904, filed on May 19, 2006, which is hereby incorporated by reference herein in its entirety.

What is claimed is:

1. An information processing apparatus comprising:
a web browser configured to display a web page that is specified by a user on a display device;
an input unit configured to accept a user instruction;
a bookmark request detection unit configured to detect an input of a bookmark request from the user through the input unit, wherein the bookmark request is for bookmarking a URL of a web page being displayed by the web browser;
a URL acquisition unit configured to acquire a URL of a web page being displayed by the web browser;
a selection unit configured to display a first selection screen that enables the user to bookmark the URL by associating it with at least one piece of information relating to a broadcast program in a case where a bookmark request from the user is detected by the bookmark request detection unit;
a program display control unit configured to display the broadcast program on the display device;
a program information acquisition unit configured to acquire attribute information of the broadcast program being displayed on the display device, the attribute information being broadcast with the broadcast program;
a first associated web page detecting unit configured to detect if there is a web page associated with the broadcast program being displayed by determining whether or not the attribute information of the broadcast program being displayed includes at least one piece of the information associated with a bookmarked URL; and a first notification unit configured to display information indicating presence of a web page associated with the broadcast program being displayed on the display device in a case where it is detected that the attribute information of the broadcast program being displayed includes at least one piece of the information associated with a bookmarked URL, wherein the selection unit is further configured to display a second selection screen that enables the user to associate a first bookmarked URL with a second bookmarked URL, each of the first and second bookmarked URLs having associated information, and wherein the first notification unit is further configured to display information indicating a presence of a first web page and a second web page in a case (a) where the attribute information of the broadcast program being displayed includes at least one piece of information associated with either the first bookmarked URL or the second bookmarked URL and (b) where the first bookmarked URL and the second bookmarked URL have been associated with each other by the user through the second selection screen.

2. The information processing apparatus according to claim 1, wherein the attribute information comprises at least one of information capable of specifying a program, a key word, a cast member name, a genre, and a channel, and wherein the information processing apparatus further comprises:

a control unit configured to display a designation screen that enables the user to select, as the at least one piece of information relating to a broadcast program, a genre from among a plurality of genres to be associated with a URL, if the user instructs, via the first selection screen displayed by the selection unit, to bookmark the URL by associating it with the selected genre, the plurality of genres including at least one of news, movies, music, and sports; and a bookmark unit configured to bookmark the URL by associating it with the selected genre into the information processing apparatus.

3. The information processing apparatus according to claim 1, further comprising:

an electronic program guide (EPG) display control unit configured to display, in response to an instruction for displaying an EPG from the user through the input unit, an EPG on the display device;

a second associated web page detecting unit configured to detect a web page associated with a broadcast program contained in the EPG being displayed based on the attribute information of the broadcast program contained in the EPG being displayed and the information associated with the bookmarked URL; and a second notification unit configured to display, for a program which is detected by the second associated web page detecting unit that there is an associated web page, information indicating that there is an associated web page on a display area of the broadcast program in the EPG.

4. The information processing apparatus according to claim 1, wherein the web browser displays the web page associated with the broadcast program being displayed on the display device in response to an instruction for displaying the web page associated with the broadcast program from the user through the input unit.

5. The information processing apparatus according to claim 2, wherein the control unit is further configured to display a channel designation screen that enables the user to select, as the at least one piece of information relating to a broadcast program, a channel, from among a plurality of channels, to be associated with the URL, if the user instructs, via the first selection screen displayed by the selection unit, to bookmark the URL by associating it with the selected channel, and wherein the bookmark unit is further configured to bookmark the URL by associating it with the selected channel into the information processing apparatus.

6. The information processing apparatus according to claim 2, wherein the designation screen also enables the user to select, as the at least one piece of information relating to a broadcast program and in addition to a genre, information capable of specifying at least one of a broadcast program, a key word, a cast member name, and a channel to be associated with a URL, and wherein the bookmark unit is further configured to bookmark the URL by associating it with the selected genre and at least one of information capable of specifying at least one of a broadcast program, a key word, a cast member name, and a channel specified through the designation screen into the information processing apparatus.

7. An information processing method for associating and bookmarking information relating to a broadcast program with an arbitrary web page, comprising:

a bookmark request detection step of detecting input of a bookmark request from a user, wherein the bookmark request is for bookmarking a URL of a web page being displayed by a web browser;

a URL acquisition step of acquiring a URL of a web page being displayed by a web browser on a display device in accordance with detection of the bookmark request;

a selection step of displaying a first selection screen that enables the user to bookmark the URL by associating it with at least one piece of information relating to a broadcast program in a case where a bookmark request from the user is detected in the bookmark request detection step;

a program display control step of displaying the broadcast program on the display device;

a program information acquisition step of acquiring attribute information of the broadcast program being displayed on the display device, the attribute information being broadcast with the broadcast program;

a first associated web page detecting step of detecting if there is a web page associated with the broadcast program being displayed by determining whether or not the attribute information of the broadcast program being displayed includes at least one piece of the information associated with a bookmarked URL; and a first notification step of displaying information indicating presence of a web page associated with the broadcast program being displayed on the display device in a case where it is detected that the attribute information of the broadcast program being displayed includes at least one piece of the information associated with a bookmarked URL, wherein the selection step further displays a second selection screen that enables the user to associate a first bookmarked URL with a second bookmarked URL, each of the first and second bookmarked URLs having associated information, and wherein the first notification step further displays information indicating a presence of a first web page and a second web page in a case (a) where the attribute information of the broadcast program being displayed includes at least one piece of information associated with either the first bookmarked URL or the second bookmarked URL and (b) where the first bookmarked URL and the second bookmarked URL have been associated with each other by the user through the second selection screen.

8. A non-transitory computer-readable storage medium which stores a computer-executable program for causing a computer to execute the information processing method as set forth in claim 7.

9. The information processing method according to claim 7, wherein the attribute information comprises at least one of information capable of specifying a program, a key word, a cast member name, a genre, and a channel, and
wherein the information processing method further comprises:
a control step of displaying a designation screen that enables the user to select, as the at least one piece of information relating to a broadcast program, a genre from among a plurality of genres to be associated with a URL, if the user instructs, via the first selection screen displayed in the selection step, to bookmark the URL by associating it with the selected genre, the plurality of genres including at least one of news, movies, music, and sports; and
a bookmark step of bookmarking the URL by associating it with the selected genre into the information processing apparatus.

10. The information processing method according to claim 9, wherein, in the control step, a channel designation screen is displayed that enables the user to select, as the at least one piece of information relating to a broadcast program, a channel, from among a plurality of channels, to be associated with a URL, if the user instructs, via the first selection screen displayed in the selection step, to bookmark the URL by associating it with the selected a channel, and
wherein the bookmark step further bookmarks the URL by associating it with the selected channel.

11. The information processing method according to claim 9, wherein the designation screen also enables the user to select, as the at least one piece of information relating to a broadcast program and in addition to a genre, information capable of specifying at least one of a broadcast program, a key word, a cast member name, and a channel to be associated with URL, and
wherein the bookmark step further bookmarks the URL by associating it with the selected genre and at least one of information capable of specifying at least one of a broadcast program, a key word, a cast member name, and a channel specified through the designation screen.

12. The information processing method according to claim 7, further comprising:
an electronic program guide (EPG) display control step of displaying, in response to an instruction for displaying an EPG from the user, an EPG on the display device;
a second associated web page detecting step of detecting a web page associated with a broadcast program contained in the EPG being displayed based on the attribute information of the broadcast program contained in the EPG being displayed and the information associated with the bookmarked URL; and
a second notification step of displaying, for a program which is detected in the second associated web page detecting step that there is an associated web page, information indicating that there is an associated web page on a display area of the broadcast program in the EPG.

13. The information processing method according to claim 7, wherein the web browser displays the web page associated with the broadcast program being displayed on the display device in response to an instruction for displaying the web page associated with the broadcast program from the user.

* * * * *